(12) United States Patent
Isono

(10) Patent No.: US 9,827,962 B2
(45) Date of Patent: Nov. 28, 2017

(54) MASTER CYLINDER AND MASTER CYLINDER APPARATUS

(71) Applicant: Hiroshi Isono, Mishima (JP)

(72) Inventor: Hiroshi Isono, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 408 days.

(21) Appl. No.: 14/423,156

(22) PCT Filed: Oct. 17, 2013

(86) PCT No.: PCT/IB2013/002314
§ 371 (c)(1),
(2) Date: Feb. 23, 2015

(87) PCT Pub. No.: WO2014/072777
PCT Pub. Date: May 15, 2014

(65) Prior Publication Data
US 2015/0251643 A1    Sep. 10, 2015

(30) Foreign Application Priority Data

Nov. 8, 2012   (JP) ................................. 2012-246367

(51) Int. Cl.
*B60T 13/66* (2006.01)
*B60T 13/68* (2006.01)
(Continued)

(52) U.S. Cl.
CPC ............. *B60T 11/224* (2013.01); *B60T 7/042* (2013.01); *B60T 11/20* (2013.01); *B60T 11/26* (2013.01);
(Continued)

(58) Field of Classification Search
CPC ...... B60T 7/042; B60T 8/4077; B60T 8/4086; B60T 11/20; B60T 11/224; B60T 11/26; B60T 13/146; B60T 13/147; B60T 13/662; B60T 13/686
See application file for complete search history.

(56) References Cited

U.S. PATENT DOCUMENTS 8,801,112 B2 *   8/2014  Ishida ..................... B60T 7/042
                                                     303/114.2
2002/0008426 A1    1/2002  Isono
(Continued)

FOREIGN PATENT DOCUMENTS

CN          102099231 A        6/2011
DE       102009033499 A1       1/2010
(Continued)

OTHER PUBLICATIONS

Machine Translation of JP 2007 196824 A; Matsuno, Isao; Aug. 2007; Japan.*
Jun. 12, 2017 Office Action issued in U.S. Appl. No. 14/420,497.

*Primary Examiner* — Logan Kraft
(74) *Attorney, Agent, or Firm* — Oliff PLC

(57) ABSTRACT

A master cylinder includes: an input piston that is caused to advance by operating a brake operating member; a pressure piston that is provided coaxially with the input piston in order to increase a fluid pressure in a frontward pressure chamber while advancing; and a multistage modification device that varies a relationship between a stroke of the input piston and the fluid pressure in the pressure chamber in three or more stages while the input piston moves from a retreat end position to an advancement end position.

13 Claims, 11 Drawing Sheets

(51) Int. Cl.
  *B60T 11/224* (2006.01)
  *B60T 7/04* (2006.01)
  *B60T 11/20* (2006.01)
  *B60T 13/14* (2006.01)
  *B60T 11/26* (2006.01)

(52) U.S. Cl.
  CPC .......... *B60T 13/146* (2013.01); *B60T 13/662* (2013.01); *B60T 13/686* (2013.01)

(56) References Cited

U.S. PATENT DOCUMENTS

| | | |
|---|---|---|
| 2002/0124563 A1 | 9/2002 | Ogiwara et al. |
| 2011/0115282 A1 | 5/2011 | Dinkel et al. |
| 2011/0259004 A1 | 10/2011 | Bae et al. |
| 2011/0285199 A1 | 11/2011 | Ish Ida |
| 2012/0324883 A1 | 12/2012 | Isono |
| 2015/0197228 A1 | 7/2015 | Isono |

FOREIGN PATENT DOCUMENTS

| | | | |
|---|---|---|---|
| DE | 102011085986 A1 | | 7/2012 |
| JP | 2002-127891 A | | 5/2002 |
| JP | 2002-321609 A | | 11/2002 |
| JP | 2007196824 A | * | 8/2007 |
| JP | 2008-024098 A | | 2/2008 |
| JP | 2012-001069 A | | 1/2012 |
| WO | 2013/175556 A1 | | 11/2013 |

* cited by examiner

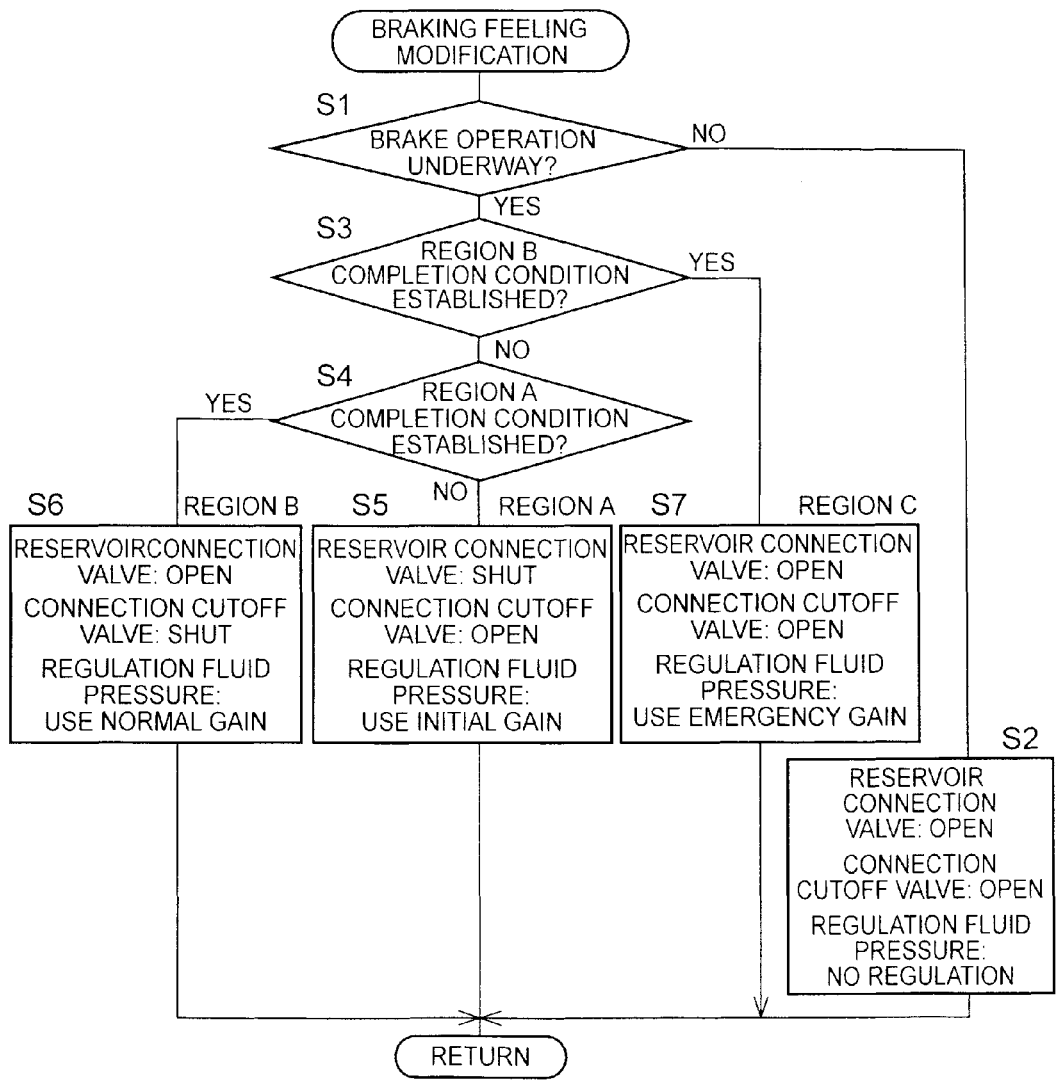

|  | IN-PISTON CONNECTION CUTOFF VALVE | CHECK VALVE |
|---|---|---|
| REGION A (INITIAL STAGE) | shut | (open) |
| REGION B (INTERMEDIATE STAGE) | shut | (shut) |
| REGION C (FINAL STAGE) | open | (open) |

MASTER CYLINDER AND MASTER CYLINDER APPARATUS

BACKGROUND OF THE INVENTION

1. Field of the Invention

The invention relates to a master cylinder included in a hydraulic brake system, and a master cylinder apparatus including the master cylinder.

2. Description of Related Art

In a master cylinder including an input piston and a pressure piston, described in Japanese Patent Application Publication No. 2008-24098 (JP 2008-24098 A), the pressure piston can be caused to advance relative to the input piston by a fluid pressure in a back surface chamber provided rearward of the pressure piston.

An object of the invention is to improve a braking feeling in a hydraulic brake system having a master cylinder that includes an input piston and a pressure piston.

SUMMARY OF THE INVENTION

In a master cylinder according to the invention, a relationship between a stroke of an input piston and a fluid pressure in a pressure chamber is varied in three or more stages while the input piston moves from a retreat end position to an advancement end position. While the input piston moves from the retreat end position to the advancement end position, it is often the case, for example, that high responsiveness is required in a region at the start of a brake operation (an initial region), high controllability is required in a region of a normal brake operation (a normal region), and high efficacy is required in a region of an emergency brake operation (an emergency region). By varying the relationship between the stroke of the input piston and the fluid pressure in the pressure chamber in at least three stages while the input piston moves from the retreat end position to the advancement end position, the above requirements of a driver relating to the braking feeling, for example, can be satisfied. Note that the invention has been designed on the assumption that an abnormality has not occurred in the master cylinder, a hydraulic brake system including the master cylinder, and so on, and does not imply that the relationship between the stroke of the input piston and the fluid pressure in the pressure chamber is varied in at least three stages likewise when an abnormality occurs. Further, a period required for the input piston to move from the retreat end position to the advancement end position corresponds to a single continuous braking operation.

Inventions recognized in this application to be claimable, or features of those inventions, will be described below.

A master cylinder according to a first aspect of the invention includes an input piston that is caused to advance by operating a brake operating member; a pressure piston that is provided coaxially with the input piston in order to increase a fluid pressure in a frontward pressure chamber while advancing; and a multistage modification device that varies a relationship between a stroke of the input piston and the fluid pressure in the pressure chamber in three or more stages while the input piston moves from a retreat end position to an advancement end position. The multistage modification device may modify the relationship between the stroke of the input piston and the fluid pressure in the pressure chamber in three stages, four or more stages, or continuously.

In the aspect described above, the multistage modification device may switch between at least a first condition in which a stroke variation velocity of the pressure piston is larger than a stroke variation velocity of the input piston so that the pressure piston can advance relative to the input piston, a second condition in which the stroke variation velocity of the pressure piston is smaller than the stroke variation velocity of the input piston so that relative advancement is possible, and a third condition in which the stroke variation velocity of the pressure piston and the stroke variation velocity of the input piston are identical so that the input piston and the pressure piston can advance integrally. In the first condition, high responsiveness is obtained, and in the second condition, controllability is obtained. In the third condition, the fluid pressure in the pressure chamber can be increased by increasing an assist force, and as a result, high efficacy is obtained. The stroke is a length from the retreat end position, and the stroke variation velocity is a stroke variation amount (a movement amount) per unit time.

In the aspect described above, the multistage modification device may set the first condition when a brake operation state quantity, which is represented by at least one of a depression force and an operating stroke of the brake operating member, is smaller than a predetermined normal operation determination state quantity, sets the second condition when the brake operation state quantity equals or exceeds the normal operation determination state quantity but is smaller than a predetermined emergency operation determination state quantity, and sets the third condition when the brake operation state quantity equals or exceeds the emergency operation determination state quantity.

In the aspect described above, the master cylinder may further include an inter-piston chamber provided between the input piston and the pressure piston, wherein a surface area on which the pressure piston receives pressure from the inter-piston chamber may be larger than a surface area on which the input piston receives pressure from the inter-piston chamber. In a condition where the inter-piston chamber is cut off from a reservoir, the opposing chamber, and so on, the input piston and the pressure piston are moved relative to each other so that an amount of working fluid in the inter-piston chamber remains constant. When the effective pressure receiving surface area of the input piston relative to the inter-piston chamber is larger than the effective pressure receiving surface area of the pressure piston relative to the inter-piston chamber, the stroke of the pressure piston is larger than that of the input piston, and therefore the input piston and the pressure piston separate. When the effective pressure receiving surface area of the input piston is smaller than the effective pressure receiving surface area of the pressure piston, the stroke of the input piston is larger than that of the pressure piston, and therefore the input piston and the pressure piston approach each other.

In the aspect described above, the master cylinder may further include an inter-piston chamber disposed between the input piston and the pressure piston; an opposing chamber provided in front of the pressure piston; and an opposing chamber/inter-piston chamber connecting passage connecting the opposing chamber and the inter-piston chamber, wherein the pressure piston includes a large diameter portion, a front side small diameter portion provided in front of the large diameter portion, and a step constituted by the large diameter portion and the front side small diameter portion, and a surface area on which the pressure piston receives pressure from the opposing chamber is equal to or smaller than the surface area on which the pressure piston receives pressure from the inter-piston chamber. When an advancement direction force applied to the pressure piston increases in a condition where the opposing chamber and the inter-piston chamber are connected to each other but cut off from the reservoir, a fluid pressure in the opposing chamber increases. However, the working fluid is permitted to flow from the opposing chamber into the inter-piston chamber. As a result, the pressure piston is allowed to advance. In this case, advancement of the input piston is not permitted when the effective pressure receiving surface area of the pressure piston relative to the opposing chamber is identical to the effective pressure receiving surface area thereof relative to the inter-piston chamber, but advancement of the input piston is permitted when the effective pressure receiving surface area relative to the opposing chamber is smaller than the effective pressure receiving surface area relative to the inter-piston chamber. The effective pressure receiving surface area is a surface area of a part that substantially receives fluid pressure from a fluid chamber, and is not limited to a surface area of an opposing surface opposing the fluid chamber. For example, the effective pressure receiving surface area takes a value obtained by dividing an amount by which a capacity of the inter-piston chamber for housing the working fluid decreases when the input piston advances by a set stroke by the set stroke.

In the aspect described above, the master cylinder may further include: a reservoir; an inter-piston chamber disposed between the input piston and the pressure piston; an opposing chamber provided in front of the pressure piston; and a communication control device that controls communication conditions between the inter-piston chamber, the opposing chamber, and the reservoir, wherein the pressure piston may include the large diameter portion, the front side small diameter portion provided in front of the large diameter portion, and the step constituted by the large diameter portion and the front side small diameter portion, and the communication control device may switch between a first communication condition in which the opposing chamber and the inter-piston chamber communicate with each other but are cut off from the reservoir, a second communication condition in which the inter-piston chamber is cut off from the opposing chamber and the reservoir, and a third communication condition in which the opposing chamber and the inter-piston chamber communicate with the reservoir. By controlling the communication conditions between the inter-piston chamber, the opposing chamber, and the reservoir, the relationship between the stroke variation velocity of the input piston and the stroke variation velocity of the pressure piston can be varied, and as a result, the relationship between the stroke of the input piston and the fluid pressure in the pressure chamber can be varied. In the second communication condition, the opposing chamber communicates with the reservoir.

In the aspect described above, the communication control device may include: a reservoir connection valve provided between the opposing chamber and the reservoir; a connection cutoff valve provided between the opposing chamber and the inter-piston chamber; and solenoid valve control portion that controls opening and closing of the reservoir connection valve and the connection cutoff valve. the communication control device may include: a reservoir connection valve provided between the opposing chamber and the reservoir; a connection cutoff valve provided between the opposing chamber and the inter-piston chamber; and solenoid valve control means for controlling opening and closing of the reservoir connection valve and the connection cutoff valve. The reservoir connection valve and the connection cutoff valve can be opened and closed on the basis of the operating condition represented by at least one of the operating stroke and the operating force of the brake operating member, for example.

In the aspect described above, the master cylinder may further include: an inter-piston chamber disposed between the input piston and the pressure piston; an opposing chamber provided in front of the pressure piston-so as to always communicate with the reservoir; an in-piston connection cutoff valve provided in an interior of the pressure piston in order to cut the inter-piston chamber off from the opposing chamber when the input piston and the pressure piston are separated from each other and connect the inter-piston chamber to the opposing chamber when the input piston and the pressure piston contact each other; and a check valve provided in the interior of the pressure piston parallel to the in-piston connection cutoff valve in order to allow a working fluid to flow from the opposing chamber into the inter-piston chamber and prevent the working fluid from flowing in reverse.

In the aspect described above, the in-piston connection cutoff valve may be provided in a fluid passage formed in the interior of the pressure piston to connect the inter-piston chamber to the opposing chamber, and may include a valve seat, a valve element capable of approaching and separating from the valve seat, and a spring that biases the valve element in a direction of seating the valve element on the valve seat, and the input piston may include a valve opening member that contacts the pressure piston in order to cause the valve element to separate from the valve seat. When the inter-piston chamber is cut off from the opposing chamber, the input piston and the pressure piston advance relative to each other. The pressure piston is caused to advance by the fluid pressure in the back surface, chamber, and the input piston is caused to advance by the brake operating force. Using the check valve, a situation in which negative pressure is generated in the inter-piston chamber can be avoided favorably. The in-piston connection cutoff valve is provided in the vicinity of an inter-piston chamber side opening of the fluid passage, and the valve element is provided in an attitude opposing the inter-piston chamber. When the input piston contacts the pressure piston, the valve opening member causes the valve element to separate from the valve seat against a biasing force of the spring, with the result that the connection cutoff valve is switched to an open condition. The inter-piston chamber communicates with the reservoir via the opposing chamber, and therefore the capacity of the inter-piston chamber can be varied.

A master cylinder according to a second aspect of the invention, the master cylinder may include an input piston that is caused to advance by operating a brake operating member; a pressure piston that is provided coaxially with the input piston is configured to advance relative to the input piston; and a velocity ratio multistage modification device that varies a velocity ratio, which is a ratio between a variation speed of a stroke of the pressure piston and a variation speed of a stroke of the input piston, in three or more stages while the input piston moves from a retreat end position to an advancement end position. The velocity ratio can be varied between three different values ($\gamma v1 \neq \gamma v2 \neq \gamma v3$), for example. The values $\gamma v1$, $\gamma v2$, $\gamma v3$ may be larger than 1 or smaller than 1. The velocity ratio may also be varied between four or more different values, or may be varied continuously. Technical features described in any of items (1) to (11) may be employed in the master cylinder described in this item.

A master cylinder according to a third aspect of the invention, the master cylinder may include an input piston that is caused to advance by operating a brake operating member; a pressure piston that is provided coaxially with the input piston and is configured to advance relative to the input piston; and an inter-piston chamber that is provided between the input piston and the pressure piston, wherein a surface area on which the pressure piston receives pressure from the inter-piston chamber may be larger than a surface area on which the input piston receives pressure from the inter-piston chamber.

A master cylinder according to a fourth aspect of the invention, the master cylinder apparatus may include the master cylinder according to any one of the aspects, and a back surface fluid pressure control device that controls a fluid pressure of a back surface chamber provided in the master cylinder, wherein the back surface chamber may be provided rearward of a surface that receives pressure from the pressure piston, and the back surface fluid pressure control device may include: a power fluid pressure source that is operated by a supply of electric power to be capable of outputting high-pressure fluid pressure; and a fluid pressure control unit that brings the fluid pressure of the back surface chamber close to a target fluid pressure by using the fluid pressure from the power fluid pressure source.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a view showing an example of control of a connection cutoff valve and a reservoir connection valve included in the master cylinder;

FIG. 5 is a flowchart illustrating a braking feeling modification program stored in a storage unit of a brake electronic control unit (ECU) provided in the hydraulic brake system;

DETAILED DESCRIPTION OF EMBODIMENTS

A hydraulic brake system including a master cylinder according to an embodiment of the invention will be described in detail below on the basis of the drawings. The hydraulic brake system includes a master cylinder apparatus according to an embodiment of the invention.

Figure 1:
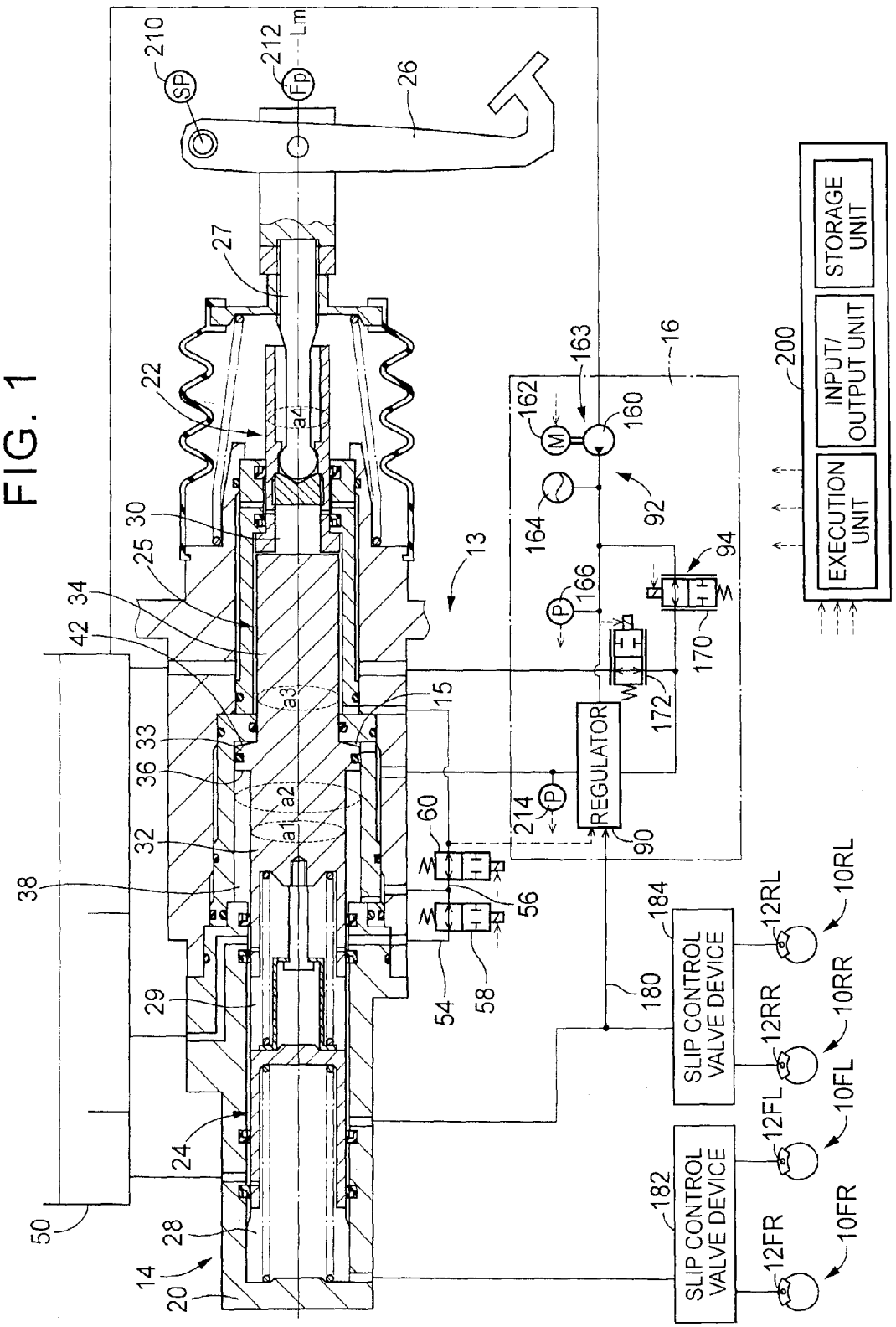
FIG. 1 is a view showing a hydraulic brake system including a master cylinder according to a first embodiment of the invention, wherein the hydraulic brake system includes a master cylinder apparatus according to the first embodiment of the invention.

The hydraulic brake system is provided in a vehicle, and as shown in FIG. 1, includes (i) brake cylinders 12FL, 12FR, 12RL, 12RR of hydraulic brakes that are provided respectively on front, rear, left, and right wheels 10FL, 10FR, 10RL, 10RR and operated by fluid pressure to suppress rotation of the respective vehicle wheels, (ii) a master cylinder apparatus 13, and so on. The master cylinder apparatus 13 includes (a) a master cylinder 14 that supplies fluid pressure to the brake cylinders 12FL, 12FR, 12RL, 12RR, (b) a regulation fluid pressure supply device 16 serving as a back surface fluid pressure control device that supplies regulation fluid pressure to a back surface chamber 15 of the master cylinder 14, and so on.

The master cylinder 14 includes (1) a housing 20, and (2) an input piston 22 and two pressure pistons 24, 25 fitted to the housing 20 to be fluid-tight and capable of sliding. The input piston 22 and the two pressure pistons 24, 25 are disposed on an identical axis (Lm) to be capable of moving relative to each other in the direction of the axis (Lm). A brake pedal 26 serving as a brake operating member is coupled to the input piston 22 via an operation rod 27 so that the input piston 22 is caused to advance in response to a depression operation of the brake pedal 26. Pressure chambers 28, 29 are formed respectively in front of the pressure pistons 24, 25. The brake cylinders 12FL, 12FR of the left and right front wheels 10FL, 10FR are connected to the pressure chamber 28, and the brake cylinders 12RL, 12RR of the left and right rear wheels 10RL, 10RR are connected to the pressure chamber 29. An inter-piston chamber 30 is formed between the pressure piston 25 and the input piston 22 to the rear thereof. Hence, in this embodiment, the master cylinder 14 is a tandem type master cylinder, and the hydraulic brake system has two systems, i.e. front and rear systems.

The pressure piston 25 takes a stepped shape having different radii. A front portion thereof is constituted by a front side small diameter portion 32, an intermediate portion is constituted by an intermediate large diameter portion 33, and a rear portion is constituted by a rear side small diameter portion 34, which has a smaller diameter than the front side small diameter portion 32. The pressure chamber 29 is provided in front of the front side small diameter portion 32. An opposing chamber 38 is formed in front of a step surface 36 between the front side small diameter portion 32 and the intermediate large diameter portion 33. The back surface chamber 15 is provided rearward of a step surface 42 serving as a pressure receiving surface between the intermediate large diameter portion 33 and the rear side small diameter portion 34. The inter-piston chamber 30 between the input piston 22 and the pressure piston 25 communicates with a reservoir 50 when the input piston 22 is in a retreat end position, but is cut off from the reservoir 50 when the input piston 22 advances. In this embodiment, the opposing chamber 38 and the reservoir 50 are connected by a reservoir passage 54, while the opposing chamber 38 and the inter-piston chamber 30 are connected by an opposing chamber/inter-piston chamber connecting passage 56. A reservoir connection valve 58 and an opposing chamber/inter-piston chamber connection cutoff valve (abbreviated to connection cutoff valve hereafter) 60 are provided respectively in the reservoir passage 54 and the opposing chamber/inter-piston chamber connecting passage 56. The reservoir connection valve 58 and the connection cutoff valve 60 are respectively constituted by normally open solenoid open/close valves that are open when no current is supplied to solenoids thereof.

Further, in this embodiment, a surface area, or in other words an effective pressure receiving surface area (a2−a1), of the step surface 36 of the pressure piston 25 that opposes the opposing chamber 38 is substantially identical to a sectional area (an effective pressure receiving surface area) a3 of a part of the rear side small diameter portion 34 positioned in the inter-piston chamber 30 (a2−a1≅a3), while the effective pressure receiving surface area a3 is larger than a sectional area, or in other words an effective pressure receiving surface area a4, of a part of the input piston 22 positioned in the inter-piston chamber 30 (a3>a4). The effective pressure receiving surface area a4 is a surface that substantially receives fluid pressure rather than an opposing surface, and takes a value obtained by dividing an amount by which a volume of the inter-piston chamber 30 occupied by the input piston 22 varies when the input piston 22 moves by a set stroke by the set stroke. Further, the front side small diameter portion 32, the intermediate large diameter portion 33, and the rear side small diameter portion 34 of the pressure piston 25 are respectively fitted to the housing 20 to be fluid-tight and capable of sliding, and therefore the back surface chamber 15, the pressure chamber 29, the opposing chamber 38, and the inter-piston chamber 30 are cut off from each other so as to be fluid-tight, whereby fluid pressure can be generated individually and independently therein.

Figure 2:
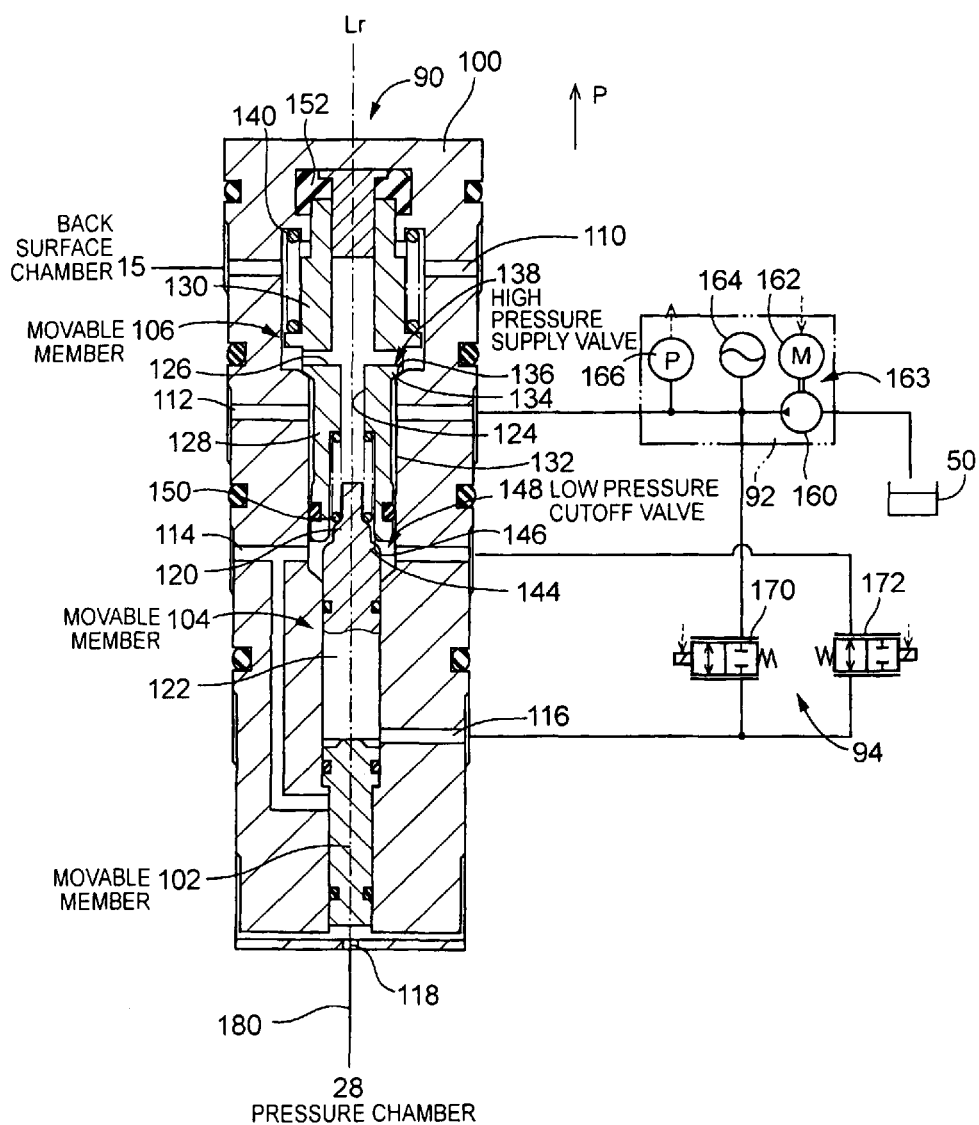
FIG. 2 is a sectional view showing a regulator of a regulation fluid pressure control device provided in the master cylinder apparatus.

As shown in FIG. 2, the regulation fluid pressure supply device 16 includes a regulator 90, a high pressure source 92, a linear valve device 94, and so on. The regulator 90 is provided between the back surface chamber 15, the high pressure source 92, the linear valve device 94, and the reservoir 50, which serve as regulation fluid pressure supply subjects, and in the regulator 90, fluid pressure supplied to the back surface chamber 15 is controlled by controlling the linear valve device 94 using fluid pressure from the high pressure source 92 and working fluid in the reservoir 50. The regulator 90 includes a housing 100, and a plurality of movable members 102 to 106 fitted to the housing 100 in series so as to be fluid-tight and capable of sliding. An output port 110 connected to the back surface chamber 15, a high pressure port 112 connected to the high pressure source 92, a low pressure port 114 connected to the reservoir 50, a linear pressure port 116 connected to the linear valve device 94, and a pilot pressure port 118 connected to the pressure chamber 28 are provided in the housing 100 at intervals in a direction of an axis (Lr).

The movable member 102 can be moved by fluid pressure in the pilot pressure port 118. A movable member 104 has a stepped shape including a small diameter portion 120 and a large diameter portion 122, wherein a large diameter portion side end surface serves as a pressure receiving surface for receiving fluid pressure from the linear pressure port 116, or in other words the fluid pressure controlled by the linear valve device 94. Thus, the movable member 104 can be moved by the fluid pressure controlled by the linear valve device 94. An axial direction passage 124 and an output passage 126 serving as a radial direction passage are formed in a mutually communicative condition in the movable member 106. The output passage 126 communicates with the output port 110. Further, the movable member 106 has a stepped shape including a small diameter portion 128 and a large diameter portion 130, wherein an annular recessed portion 132 provided in an outer peripheral surface of the small diameter portion 128 to extend in a parallel direction to the axis Lr communicates with the high pressure port 112. A step portion (a valve element) 134 between the small diameter portion 128 and the large diameter portion 130 and a step portion (a valve seat) 136 provided in the housing 100 together constitute a high pressure supply valve 138. By opening and closing the high pressure supply valve 138, the annular recessed portion 132 is connected to and cut off from the output port 110. The high pressure supply valve 138 is biased to a closed condition by a spring 140 provided between the movable member 106 and the housing 100. Further, the small diameter portion 120 of the movable member 104 is positioned inside the axial direction passage 124 of the movable member 106, whereby a step portion (a valve element) 144 between the small diameter portion 120 and the large diameter portion 122 of the movable member 104 and an opening edge portion (a valve seat) 146 of the axial direction passage 124 of the movable member 106 together constitute a low pressure cutoff valve 148. By opening and closing the low pressure cutoff valve 148, the low pressure port 114 is connected to and cut off from the output port 110. The low pressure cutoff valve 148 is biased to an open condition by a spring 150 provided between the movable member 104 and the movable member 106. An elastic member (a member formed from rubber, for example) 152 is provided between an end portion of the movable member 106 on an opposite side to the movable member 104 and the housing 100. When the elastic member 152 undergoes elastic deformation, the movable member 106 is permitted to move in a direction of an arrow P (movement in a direction for switching the high pressure supply valve 138 to an open condition).

The high pressure source 92 includes a pump device 163 having a pump (a plunger pump) 160 and a pump motor 162, an accumulator 164, and an accumulator pressure sensor 166 that detects fluid pressure in the accumulator 164, or in other words the fluid pressure in the high pressure port 112. The pump motor 162 is controlled to keep the accumulator pressure within a set range. The linear valve device 94 includes a pressure increasing linear valve 170 provided between the high pressure source 92 and the linear pressure port 116, and a pressure reducing linear valve 172 provided between the linear pressure port 116 and the reservoir 50. Respective front-rear differential pressures of the pressure increasing linear valve 170 and the pressure reducing linear valve 172 can be controlled to magnitudes corresponding to amounts of current supplied to respective solenoids thereof. Further, the pressure increasing linear valve 170 is a normally closed valve that is closed when no current is supplied to the solenoid, whereas the pressure reducing linear valve 172 is a normally open valve that is open when no current is supplied to the solenoid. By controlling the pressure increasing linear valve 170 and the pressure reducing linear valve 172, the fluid pressure in the linear pressure port 116 is controlled to a desired magnitude. Further, the fluid pressure in the pressure chamber 28 is connected to the pilot pressure port 118 via a fluid passage 180.

Note that a slip control valve device 182 including at least one solenoid valve is provided between the pressure chamber 28 and the brake cylinders 12FL, 12FR of the left and right front wheels, and a slip control valve device 184 including at least one solenoid valve is provided between the pressure chamber 29 and the brake cylinders 12RL, 12RR of the left and right rear wheels.

The hydraulic brake system is provided with a brake ECU 200 (see FIG. 1) having a computer as a main body. The brake ECU 200 includes an execution unit, an input/output unit, and a storage unit. The accumulator pressure sensor 166, a stroke sensor 210 that detects an operating stroke of the brake pedal 26, a depression force sensor 212 that detects a depression force as an operating force applied to the brake pedal 26, an output fluid pressure sensor 214 that detects the fluid pressure in the output port 110, and so on are connected to the input/output unit together with the reservoir connection valve 58, the connection cutoff valve 60, the linear valve device 94, the pump motor 162, and so on. A large number of programs and tables, including a braking feeling modification program, are stored in the storage unit of the brake ECU 200.

An operation of this hydraulic brake system will now be described. When the brake pedal 26 is in an inoperative condition, the master cylinder 14 and the regulator 90 are in origin positions shown in the drawings. In the master cylinder 14, the input piston 22 and the pressure pistons 24, 25 are in the retreat end position, and therefore the pressure chambers 28, 29 and the inter-piston chamber 30 communicate with the reservoir 50. In the regulator 90, the high pressure supply valve 138 is closed, the low pressure cutoff valve 148 is open, and the output port 110, or in other words the back surface chamber 15, communicates with the reservoir 50.

When the brake pedal 26 is depressed such that the input piston 22 is caused to advance, the inter-piston chamber 30 is cut off from the reservoir 50, and as a result, fluid pressure is generated therein. Further, regulation fluid pressure is supplied from the regulation fluid pressure supply device 16 to the back surface chamber 15, with the result that the pressure pistons 24, 25 advance relative to the input piston 22. In the regulation fluid pressure supply device 16, the current supplied to the solenoid of the linear valve device 94 is controlled such that the regulation fluid pressure, or in other words the fluid pressure output from the output port 110, approaches a target fluid pressure. By controlling the fluid pressure in the linear pressure port 116, the high pressure supply valve 138 and the low pressure cutoff valve 148 are opened and closed, and as a result, the fluid pressure in the output port 110 approaches the target fluid pressure. The target fluid pressure takes a magnitude determined on the basis of a brake operation state quantity, which is represented by at least one of the operating stroke and the depression force of the brake pedal 26, and a gain.

[Initial Stage of Brake Operation (Region A in FIG. 3)]

Figures 3A, 3B, 3C:
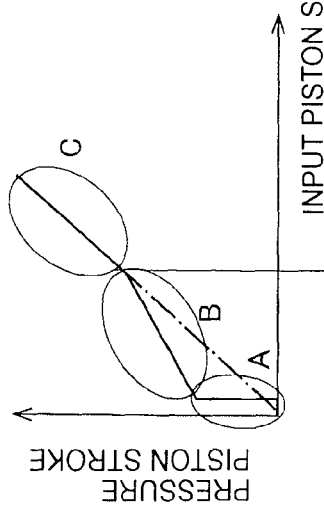
FIG. 3A is a view showing a relationship between a stroke of an input piston and a stroke of a pressure piston in the hydraulic brake system.
FIG. 3B is a view showing a relationship between an operating force exerted on a brake pedal and a regulation fluid pressure in the regulator.
FIG. 3C is a view showing a relationship between the stroke of the input piston and a fluid pressure in a brake cylinder of a front wheel.

In the master cylinder 14, as shown in FIG. 4, the reservoir connection valve 58 is closed and the connection cutoff valve 60 is open. The opposing chamber 38 and the inter-piston chamber 30 are connected to each other but cut off from the reservoir 50. Further, the surface area (a2−a1) of the step surface 36 of the pressure piston 25 that opposes the opposing chamber 38 is substantially identical to the surface area a3 of the part of the rear side small diameter portion 34 that opposes the inter-piston chamber 30 (a2−a1≅a3), and therefore working fluid is supplied in an identical amount to an amount of reduction in the volume of the inter-piston chamber 30 occupied by the pressure piston 25 due to advancement of the pressure piston 25, with the result that the input piston 22 cannot advance. Furthermore, in the pressure piston 25, a force exerted by the fluid pressure of the opposing chamber 38 and a force exerted by the fluid pressure of the inter-piston chamber 30 are counterbalanced. Hence, as shown in FIG. 3A, in a region A, the stroke of the input piston 22 does not increase, and the pressure piston 25 is caused to advance relative to the input piston 22 by the fluid pressure in the back surface chamber 15. Further, the stroke of the pressure piston 25 in the region A is determined by the fluid pressure in the back surface chamber 15. Note that in the region A, the stroke of the input piston 22 is extremely small, and therefore a ratio between a variation speed of the stroke of the pressure piston 25 and a variation speed of the stroke of the input piston 22 takes an extremely large value (a value larger than 1).

In the regulation fluid pressure supply device 16, the target fluid pressure of the back surface chamber 15 takes a magnitude determined by the depression force and an initial gain. The initial gain takes a large value, and therefore, as shown in, FIG. 3B, in the region A, the fluid pressure of the back surface chamber 15 increases quickly. As a result, the pressure pistons 25, 24 are caused to advance quickly in the master cylinder 14. By executing the control described above in the hydraulic brake system, fluid pressure corresponding to the fluid pressure of the back surface chamber 15 is generated in the pressure chambers 28, 29, or in other words the brake cylinders 12FL, 12FR, 12RL, 12RR. In this sense, it may be considered that in the region A, a hydraulic brake is operated in a regulation pressure dependent braking mode. As shown in FIG. 3C, when a relationship between the stroke of the input piston 22 and the fluid pressure of the brake cylinders 12FL, 12FR, 12RL, 12RR is compared with that of a conventional hydraulic brake system (for example, a hydraulic brake system in which the regulation fluid pressure is not increased on a sharp gradient in the region A) indicated by a dotted line, the brake fluid pressure can be increased in the region A. As a result, an initial response delay can be suppressed, and therefore high responsiveness can be obtained.

When a region A completion condition is established, for example when the depression force detected by the depression force sensor 212 reaches a normal operation determination depression force (which may also be referred to as an initial operation completion determination depression force) or the like, the control is switched to a region B. As shown in FIG. 4, the connection cutoff valve 60 is closed and the reservoir connection valve 58 is opened. For example, the normal operation determination depression force may be set at a value at which the fluid pressure in the pressure chambers 28, 29 (the fluid pressure in the brake cylinders 12FL, 12FR, 12RL, 12RR) equals or exceeds a fluid pressure at which a first fill is completed when the fluid pressure of the back surface chamber 15 is controlled to a magnitude determined by the normal operation determination depression force and the initial gain. Further, the region B is a region in which a normal brake operation is performed, and may also be referred to as a normal region or a low G region.

[Normal Region, Low G Region (Region B)]

In the master cylinder 14, the opposing chamber 38 communicates with the reservoir 50, but the inter-piston chamber 30 is cut off from both the opposing chamber 38 and the reservoir 50. The input piston 22 and the pressure piston 25 are caused to move relative to each other such that in the inter-piston chamber 30, an amount by which the volume occupied by the input piston 22 increases due to the advancement thereof is identical to an amount by which the volume occupied by the pressure piston 25 decreases due to the advancement thereof. The ratio (a speed ratio $\gamma v$) between the variation speed of the stroke of the pressure piston 25 and the variation speed of the stroke of the input piston 22 takes an inverse ($\gamma v=1/\gamma a=a4/a3$) of a ratio (a surface area ratio $\gamma a=a3/a4$) between the effective pressure receiving area (a surface area of an opposing surface, a sectional area) a3 of the pressure piston 25 relative to the inter-piston chamber 30 and the effective pressure receiving surface area (a sectional area) a4 of the input piston 22 relative to the inter-piston chamber 30, and therefore takes a value smaller than 1. Accordingly, the input piston 22 approaches the pressure piston 25. In the regulation fluid pressure supply device 16, the fluid pressure (fluid pressure of the back surface chamber 15) of the output port 110 is controlled to a magnitude determined by the depression force and a normal gain, which is smaller than the initial gain, and therefore, as shown in FIG. 3B, in the region B, the fluid pressure of the back surface chamber 15 increases on a gentle gradient as the depression force increases. In the hydraulic brake system, the fluid pressure in the brake cylinders 12FL, 12FR, 12RL, 12RR, or in other words the fluid pressure in the pressure chambers 28, 29, takes a magnitude determined by a force corresponding to the fluid pressure of the inter-piston chamber 30 (a force corresponding to the depression force applied to the input piston 22) and a force generated by the fluid pressure in the back surface chamber 15. In this sense, it may be considered that in the region B, the hydraulic brake is operated in an operating force/regulation pressure dependent low G braking mode. Further, as shown in FIG. 3C, in comparison with a conventional hydraulic brake system, the increase gradient of the brake cylinder fluid pressure relative to the stroke of the input piston 22 is gentler in the region B. By reducing the increase gradient of the brake fluid pressure relative to the stroke of the input piston 22, or in other words the stroke of the brake pedal 26, in this manner, the brake fluid pressure can be controlled more easily in accordance with the stroke of the brake pedal 26, enabling an improvement in controllability.

For example, when either the operating stroke of the brake pedal 26 (corresponding to the stroke of the input piston 22) detected by the stroke sensor 210 reaches an emergency operation determination stroke or the depression force detected by the depression force sensor 212 reaches an emergency operation determination depression force, or when both of these conditions are established, the region B is determined to be complete. As shown in FIG. 4, both the reservoir connection valve 58 and the connection cutoff valve 60 are opened, whereby the control enters a region C. The emergency operation determination stroke and the emergency operation determination depression force may be set at magnitudes from which it can be inferred that a driver requires a large braking force. The region C may also be referred to as a high G region.

[Emergency Operation Region (Region C)]

In the master cylinder 14, the opposing chamber 38 and the inter-piston chamber 30 communicate with the reservoir 50. The input piston 22 contacts the pressure piston 25 such that the input piston 22 and the pressure piston 25 advance integrally. As shown in FIG. 3A, in the region C, the stroke velocity ratio between the input piston 22 and the pressure piston 25 is 1. In the regulation fluid pressure supply device 16, as shown in FIG. 3B, the fluid pressure of the back surface chamber 15 in the region C is controlled to a magnitude determined on the basis of the depression force and an emergency gain that is larger than the normal gain but smaller than the initial gain. Accordingly, the increase gradient of the fluid pressure in the back surface chamber 15 is larger than that of the region B. In the hydraulic brake system, fluid pressure determined by the depression force and a force corresponding to the fluid pressure of the back surface chamber 15 is generated in the brake cylinders 12FL, 12FR, 12RL, 12RR (the pressure chambers 28, 29). In this sense, it may be considered that in the region C, the hydraulic brake is operated in an operating force/regulation pressure dependent high G braking mode. As shown in FIG. 3C, in the region C, the increase gradient of the brake fluid pressure relative to the stroke of the input piston 22 is increased, and therefore the brake fluid pressure also increases. As a result, high efficacy is obtained.

The braking feeling modification program, which is illustrated on a flowchart shown in FIG. 5, is executed at predetermined set time intervals. In step 1 (abbreviated to S1 hereafter; likewise for all other steps), a determination is made as to whether or not a brake operation is underway. For example, it may be determined that a brake operation is underway when the operating stroke of the brake pedal 26 detected by the stroke sensor 210 reaches or exceeds an operation determination set stroke (a stroke at which the inter-piston chamber 30 is cut off from the reservoir 50, for example) or when the depression force detected by the depression force sensor 212 reaches or exceeds an operation determination set depression force (of a magnitude from which it can be determined reliably that the driver has depressed the brake pedal 26, for example). Note that a brake switch may be provided, and the brake operation may be determined to be underway when the brake switch turns ON. In a brake inoperative condition, no current is supplied to the solenoids of the reservoir connection valve 58 and the connection cutoff valve 60 in S2, and therefore the reservoir connection valve 58 and the connection cutoff valve 60 are kept in their origin positions shown in the drawings, or in other words kept open. Further, in the regulation fluid pressure supply device 16, no current is supplied to the solenoid of the linear valve device 94, and therefore the back surface chamber 15 communicates with the reservoir 50.

When a brake operation is underway, a determination is made in S3 as to whether or not a region B completion condition is established, and a determination is made in S4 as to whether or not the region A completion condition is established. When both determinations are negative, the control is in the region A, and therefore, in S5, the reservoir connection valve 58 is closed, the connection cutoff valve 60 is opened, and the target fluid pressure of the fluid pressure in the back surface chamber 15 is set at the magnitude determined by the depression force and the initial gain. Accordingly, the regulation fluid pressure, or in other words the fluid pressure in the back surface chamber 15, increases on an extremely large gradient. Further, when the region B completion condition is not established but the region A completion condition is established, the determination of S4 is negative while the determination of S5 is affirmative, and therefore, in S6, the reservoir connection valve 58 is opened, the connection cutoff valve 60 is closed, and the target fluid pressure of the back surface chamber 15 is set at the magnitude determined on the basis of the depression force and the normal gain. Accordingly, the regulation fluid pressure increases on a gentle gradient. Furthermore, when the region B completion condition is established, the determination of S4 is affirmative, and therefore, in S7, both the reservoir connection valve 58 and the connection cutoff valve 60 are opened, and the target fluid pressure of the back surface chamber 15 is set at the value determined by the depression force and the emergency gain. Accordingly, the regulation fluid pressure increases on a large gradient.

Hence, in this embodiment, by controlling opening and closing of the reservoir connection valve 58 and the connection cutoff valve 60, the braking feeling is switched in three stages, and as a result, a braking feeling corresponding to the requirements of the driver is obtained.

When an abnormality occurs in an electrical system or the like, a current can no longer be supplied to the solenoids, and therefore the reservoir connection valve 58 and the connection cutoff valve 60 enter a communicative condition such that both the opposing chamber 38 and the inter-piston chamber 30 communicate with the reservoir 50. Further, in the regulation fluid pressure supply device 16, no current is supplied to the linear valve device 94, and therefore the linear pressure port 116 communicates with the reservoir 50, while the fluid pressure of the pressure chamber 29 is supplied to the pilot pressure port 118. As a result, the movable member 102 is moved in the direction of the arrow P, and both the movable member 104 and the movable member 106 are moved. The low pressure cutoff valve 148 is closed, and the high pressure supply valve 138 is opened. The fluid pressure of the back surface chamber 15 can be increased (regulated) as long as fluid pressure remains in the accumulator 164. Further, even when fluid pressure cannot be supplied from the accumulator 164, the master cylinder 14 can be operated manually. In the master cylinder 14, by the input piston 22 is caused to contact the pressure piston 25 by the depression force applied to the brake pedal 26, whereby the input piston 22 and the pressure piston 24 advance integrally. Fluid pressure is generated in the pressure chambers 28, 29, and the fluid pressure is supplied to the brake cylinders 12FL, 12FR, 12RL, 12RR. Note that in the regulation fluid pressure supply device 16, working fluid can be supplied from the reservoir 50 to the output port 110 by an action of a check valve (a discharge valve, an intake valve) provided in the plunger pump 160.

When the inter-piston chamber 30 is cut off from the reservoir 50 in the regions A and B, the pressure piston 25 advances relative to the input piston 22. More specifically, in the region A, the pressure piston 25 advances relative to the input piston 22 such that the two pistons separate from each other. In the region B, the input piston 22 and the pressure piston 25 approach each other. In the region C, the inter-piston chamber 30 communicates with the reservoir 50 such that the pressure piston 25 and the input piston 22 advance integrally. In other words, when the inter-piston chamber 30 is cut off from the reservoir 50, an amount by which the pressure piston 25 advances relative to the input piston 22 is regulated, and thereafter, as indicated by a dot-dash line in FIG. 3A, a stroke of the input piston 22 and the pressure piston 25 while in contact with each other corresponds to a hypothetical stroke in a case where the input piston 22 and the pressure piston 25 advance integrally from the start of the brake operation.

In the embodiment described above, the connection cutoff valve 60, the reservoir connection valve 58, the parts of the brake ECU 200 for storing and executing the braking feeling modification program, and so on together constitute a multistage modification device. The multistage modification device corresponds to a velocity ratio modification device. Further, parts of the multistage modification device for storing and executing S5, S6, and S7 of the flowchart shown in FIG. 5 and so on together constitute a stroke relationship modification unit. The stroke relationship modification unit also serves as a communication condition control unit and a solenoid valve control unit. Moreover, a part for controlling the fluid pressure of the back surface chamber 15 in S5, S6, and S7 and so on constitutes a fluid pressure control unit, and parts for determining the respective target fluid pressure values in S5, S6, and S7 and so on respectively constitute a first determination unit, a second determination unit, and a third determination unit.

By providing a fluid pressure sensor that detects the fluid pressure in the inter-piston chamber 30, the brake depression force applied to the brake pedal 26 in the regions A and B can be determined on the basis of a detection value from the fluid pressure sensor. Further, as shown by a dotted line in FIG. 1, the fluid pressure of the inter-piston chamber 30 may be supplied to the pilot pressure port 118 in the regulator 90. In this case, the regulator 90 is held in an origin position shown in the drawing when an abnormality occurs in the electrical system. The reason for this is that when an abnormality occurs in the electrical system, the inter-piston chamber 30 communicates with the reservoir 50. Furthermore, the regulator 90 is not essential, and instead, the linear valve device 94 may be connected to the back surface chamber 15. Moreover, the regulator 90 is not limited to the structure described in this embodiment.

Figure 6:
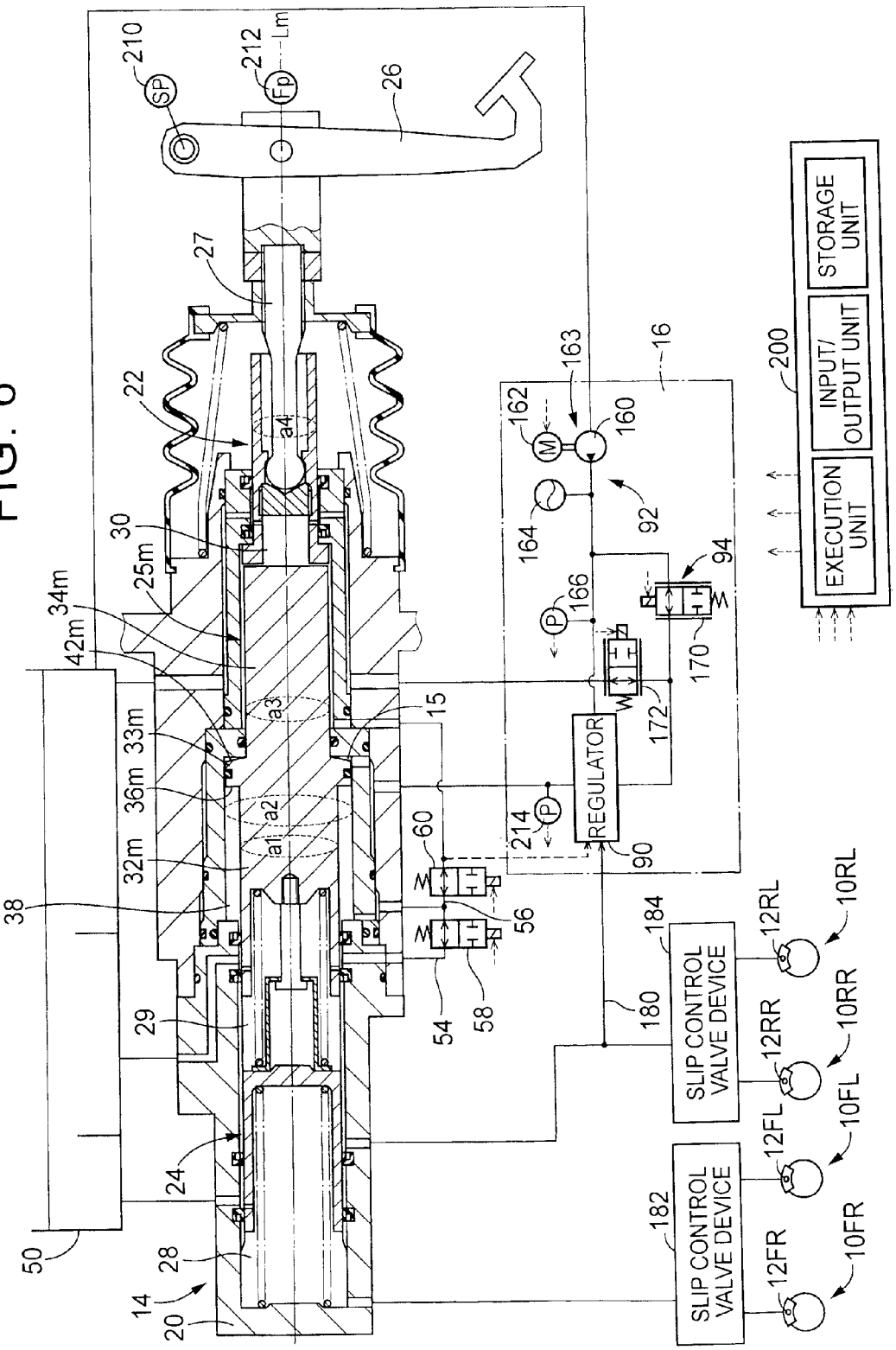
FIG. 6 is a view showing a hydraulic brake system including a master cylinder according to a second embodiment of the invention, wherein the hydraulic brake system includes a master cylinder apparatus according to the second embodiment.
Figure 7A:
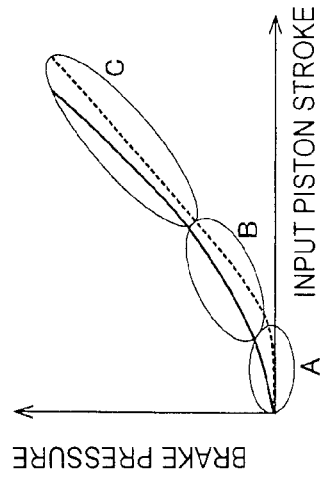
FIG. 7A is a view showing the relationship between the stroke of the input piston and the stroke of the pressure piston in the hydraulic brake system.
Figure 7B:
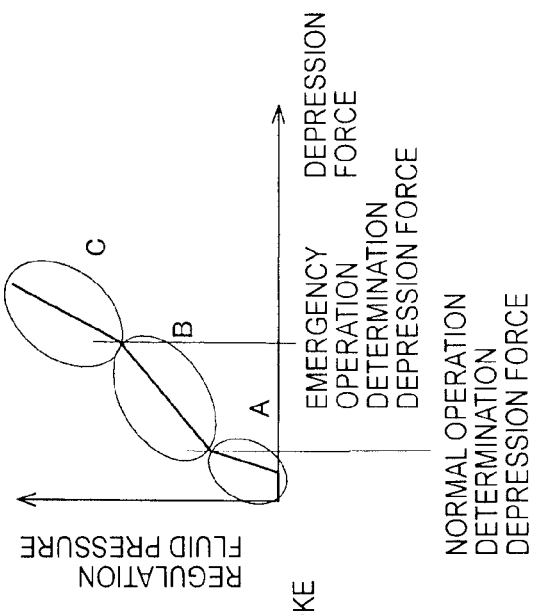
FIG. 7B is a view showing the relationship between the operating force exerted on the brake pedal and the regulation fluid pressure in the regulator.
Figure 7C:
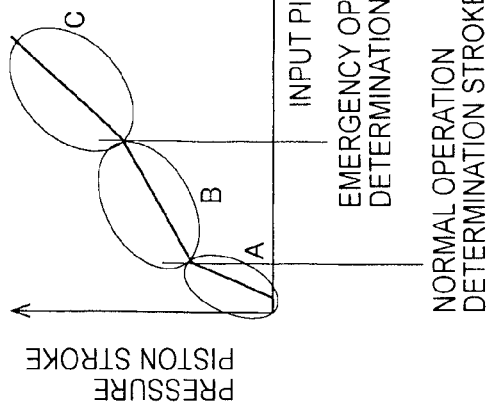
FIG. 7C is a view showing the relationship between the stroke of the input piston and the fluid pressure in the brake cylinder of the front wheel.

The master cylinder is not limited to the structure described in this embodiment. As shown in FIG. 6, for example, the effective pressure receiving surface area (a2−a1) of a step surface 36m of a pressure piston 25m that opposes the opposing chamber 38 may be made smaller than the effective pressure receiving surface area a3 of a rear side small diameter portion 34m relative to the inter-piston chamber 30 (a2−a1<a3). In this case, in the region A, or in other words when the reservoir connection valve 58 is closed and the connection cutoff valve 60 is open, it is impossible to compensate for the reduction in the volume of the inter-piston chamber 30 occupied by the pressure piston 25m due to the advancement of the pressure piston 25m by supplying working fluid from the opposing chamber 38 to the inter-piston chamber 30 as the pressure piston 25m advances, and therefore the input piston 22 is permitted to advance correspondingly. In the region A, therefore, as shown in FIG. 7A, the ratio γv between the variation speed of the stroke of the pressure piston 25m and the variation speed of the stroke of the input piston 22 is a4/{a3−(a2−a1)}. As a result, the input piston 22 is permitted to stroke in the region A, and therefore the operating feeling in the region A can be improved.

Further, in the pressure piston 25m, the effective pressure receiving surface area a3 relative to the inter-piston chamber 30 differs from the effective pressure receiving surface area (a2−a1) relative to the opposing chamber 38, and therefore an advancement direction force corresponding to the fluid pressure in the inter-piston chamber 30 acts on the pressure piston 25*m*. As a result, fluid pressure of a magnitude determined in accordance with a force corresponding to the fluid pressure in the inter-piston chamber 30 and a force corresponding to the fluid pressure in the back surface chamber 15 is generated in the pressure chambers 28, 29 (the brake cylinders 12FL, 12FR, 12RL, 12RR). In this sense, it may be considered that in the region A, the hydraulic brake is operated in an operating force/regulation pressure dependent mode.

Note that in this embodiment, the region A completion condition may be established when the operating stroke of the brake pedal 26 reaches a normal operation determination stroke.

Figure 8:
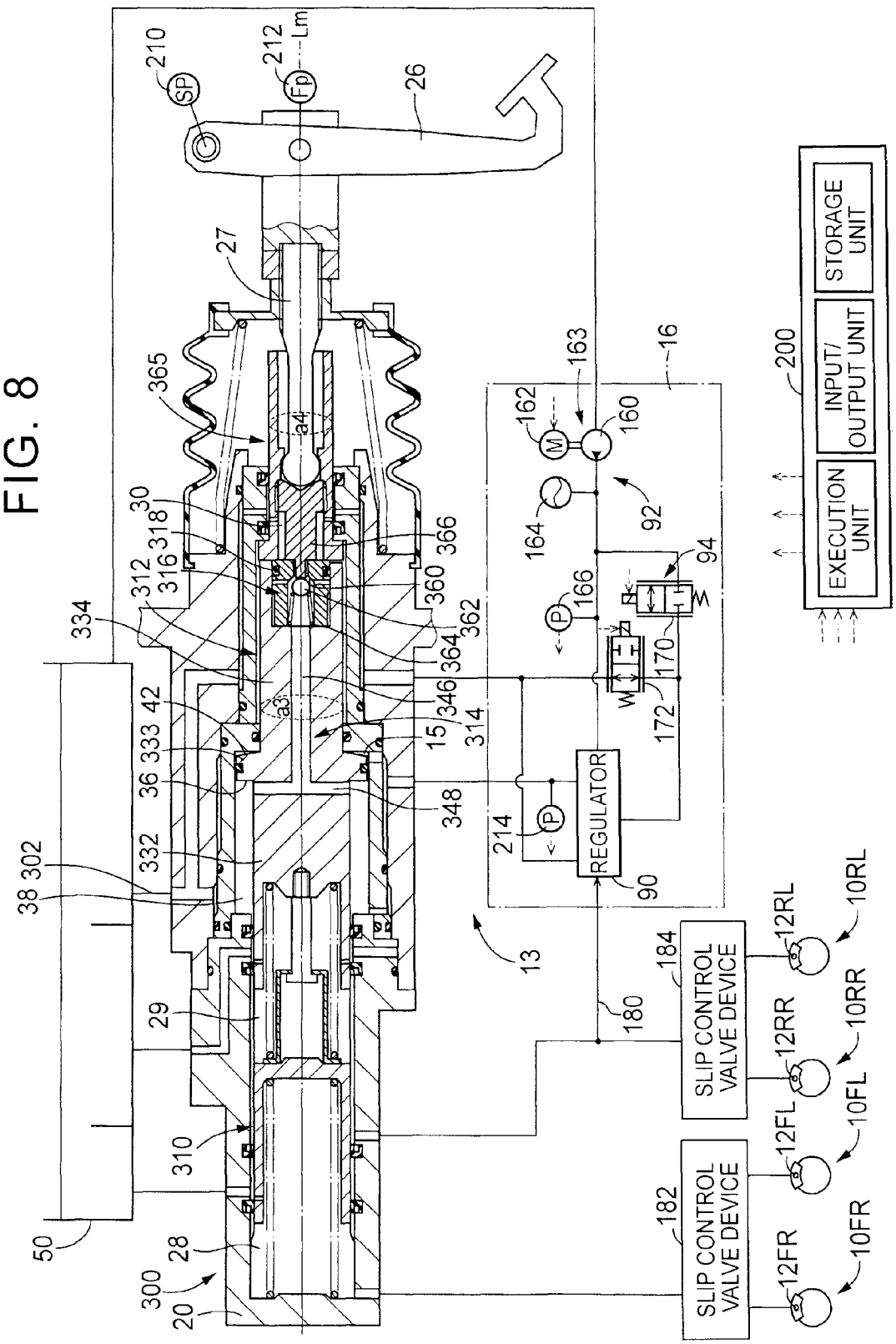
FIG. 8 is a view showing a hydraulic brake system including a master cylinder according to a third embodiment of the invention, wherein the hydraulic brake system includes a master cylinder apparatus according to the third embodiment of the invention.

In the master cylinder described in the first and second embodiments, the braking feeling is modified in three stages by controlling the two solenoid open/close valves 58, 60. However, the braking feeling may be modified in three stages using valves that are opened and closed mechanically. As shown in FIG. 8, in a master cylinder 300 included in a hydraulic brake system according to a third embodiment, the opposing chamber 38 normally communicates with the reservoir 50 via a reservoir passage 302. The master cylinder 300 also differs from the master cylinder 14 according to the first embodiment in that an inter-piston chamber/opposing chamber connecting passage 314, an in-piston connection cutoff valve 316, and a check valve 318 are provided in an interior of a pressure piston 312 located to the rear of two pressure pistons 310, 312, and so on. All other configurations are similar to the first embodiment, and therefore description thereof has been omitted. The pressure piston 312 has a stepped shape in which a front portion is constituted by a front side small diameter portion 332, an intermediate portion is constituted by an intermediate large diameter portion 333, and a rear portion is constituted by a rear side small diameter portion 334 having a smaller diameter than the front side small diameter portion 332. The inter-piston chamber/opposing chamber connecting passage 314 is provided on a rear side of the intermediate portion of the pressure piston 312. The inter-piston chamber/opposing chamber connecting passage 314 includes an axial direction passage 346 extending in an axial direction and a radial direction passage 348 extending in a radial direction, wherein the axial direction passage 346 and the radial direction passage 348 are mutually communicative. The axial direction passage 346 opens onto the inter-piston chamber 30, and the radial direction passage 348 opens onto the opposing chamber 38. The in-piston connection cutoff valve 316 and the check valve 318 are provided in parallel in the vicinity of an inter-piston chamber 30 side opening of the inter-piston chamber/opposing chamber connecting passage 314. The in-piston connection cutoff valve 316 includes a valve seat 360, a valve element 362 provided to be capable of approaching and separating from the valve seat 360, and a spring 364 that biases the valve element 362 toward the valve seat 360, wherein the valve element 362 is disposed to face the inter-piston chamber 30 side opening. Meanwhile, a valve opening member 366 is provided on a front portion of an input piston 365 to be capable of moving integrally therewith in the axial direction. When the input piston 365 contacts the pressure piston 312, the valve opening member 366 causes the valve element 362 to separate from the valve seat 360 against a biasing force of the spring 364, with the result that the in-piston connection cutoff valve 316 is switched to an open condition. Further, the check valve 318 allows the working fluid to flow from the opposing chamber 38 into the inter-piston chamber 30, but prevents the working fluid from flowing in reverse.

In the master cylinder 300, the effective pressure receiving area a3 of the rear side small diameter portion 334 of the pressure piston 312 relative to the inter-piston chamber 30 is set to be larger than the effective pressure receiving surface area a4 of the input piston 365 relative to the inter-piston chamber 30 (a3>a4).

An operation of this hydraulic brake system will now be described.

[Initial Stage of Brake Operation (Region A)]

Figures 9, 10:
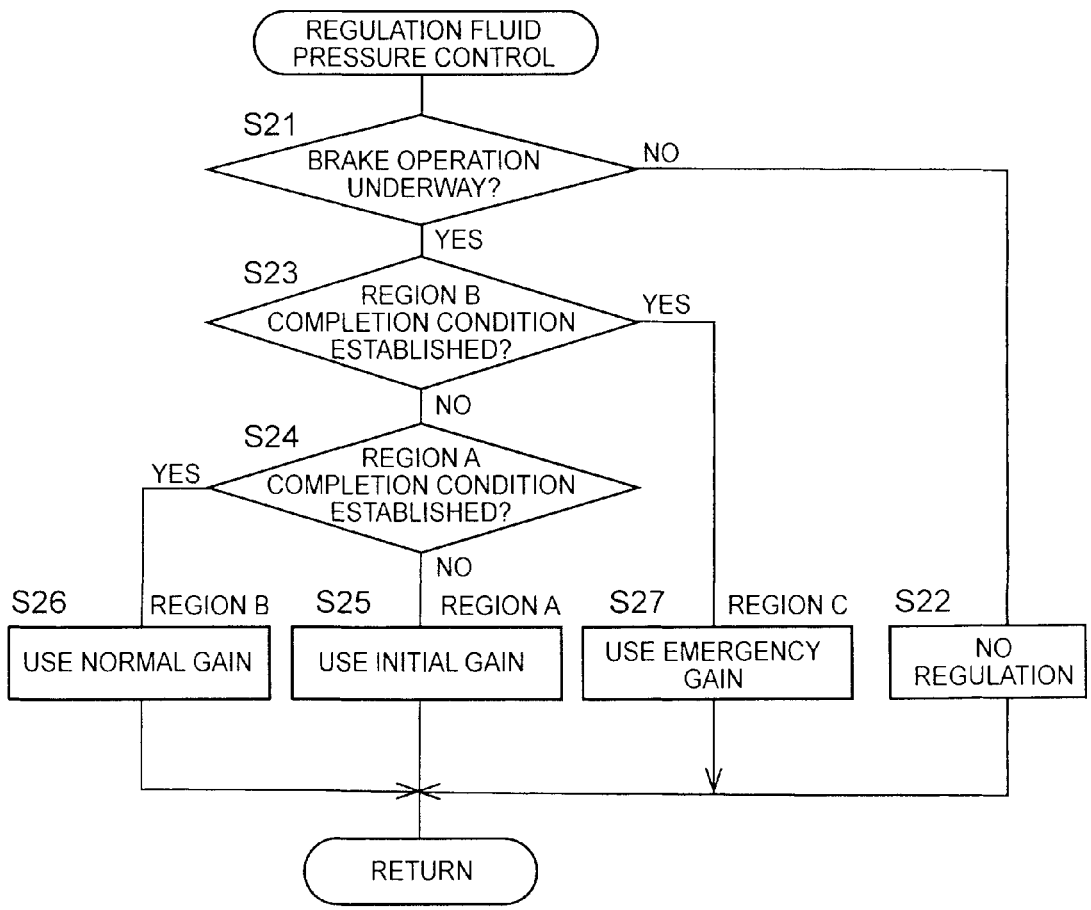
FIG. 9 is a view showing conditions of the connection cutoff valve and a check valve included in the master cylinder.
FIG. 10 is a flowchart illustrating a regulation fluid pressure control program stored in the storage unit of the brake ECU provided in the hydraulic brake system.

In the master cylinder 300, when the pressure piston 312 is caused to advance by the fluid pressure in the back surface chamber 15, the pressure piston 312 separates from the input piston 365, and as a result, the in-piston connection cutoff valve 316 is closed. Further, as the input piston 365 advances, the inter-piston chamber 30 is cut off from the reservoir 50 such that fluid pressure is generated therein. As shown in FIG. 9, the in-piston connection cutoff valve 316 is closed. In the regulation fluid pressure supply device 16, similarly to the first and second embodiments, the fluid pressure in the back surface chamber 15 increases on an extremely large gradient, and is thus regulated to the magnitude determined on the basis of the depression force and the initial gain. The increase gradient of the fluid pressure in the back surface chamber 15 is larger than an increase gradient of the depression force, and therefore the pressure piston 312 is caused to advance relative to (separate from) the input piston 365. The working fluid can flow into the inter-piston chamber 30 from the reservoir 50 via the check valve 318, and therefore the pressure piston 312 is permitted to advance relative to the input piston 365. Hence, a situation in which the fluid pressure in the inter-piston chamber 30 becomes negative can be avoided favorably.

[Normal Brake Region (Region B)]

In the master cylinder 300, the connection cutoff valve 316 remains closed. In the regulation fluid pressure supply device 16, the fluid pressure of the back surface chamber 15 is set at the magnitude determined on the basis of the depression force and the normal gain, and increases gently. In the master cylinder 300, the ratio between the variation speed of the stroke of the input piston 365 and the variation speed of the stroke of the pressure piston 312 is a4/a3 (<1), and therefore the pressure piston 312 and the input piston 365 approach each other within the inter-piston chamber 30.

[Emergency Brake Region (Region C)]

Meanwhile, when the input piston 365 contacts the pressure piston 312, the control is switched to the region C. In the master cylinder 300, the valve opening member 366 switches the connection cutoff valve 316 to the open condition such that the inter-piston chamber 30 communicates with the opposing chamber 38, or in other words with the reservoir 50. The input piston 365 and the pressure piston 312 are caused to advance integrally by the depression force and the fluid pressure in the back surface chamber 15. The ratio between the variation speed of the stroke of the input piston 365 and the variation speed of the stroke of the pressure piston 312 is 1.

Note that the region A is determined to be complete when either the stroke of the input piston 365 reaches the normal operation determination stroke or the depression force reaches the normal operation determination depression force, or when both of these conditions are established.

A regulation fluid pressure modification program illustrated on a flowchart shown in FIG. 10 is executed at predetermined set time intervals. In S21, a determination is made as to whether or not a brake operation is underway, and when an operation is underway, determinations as to whether or not the region B completion condition is established and whether or not the region A is complete are made respectively in S22 and S23. When neither the region B completion condition nor the region A completion condition is established, the control is in the region A, and therefore, in S24, the fluid pressure in the back surface chamber 15 is controlled to the magnitude determined by the depression force and the initial gain, whereupon the fluid pressure increases on an extremely large gradient. When the region B completion condition is not established but the region A completion condition is established, the control is in the region B, and therefore, in S25, the fluid pressure in the back surface chamber 15 is controlled to the magnitude determined by the depression force and the normal gain. When the region B completion condition is established, the control is in the region C, and therefore, in S26, the fluid pressure in the back surface chamber 15 is controlled to the magnitude determined on the basis of the depression force and the emergency gain. Hence, in this embodiment, the braking feeling can be modified in three stages without using a solenoid control valve.

Figure 11:
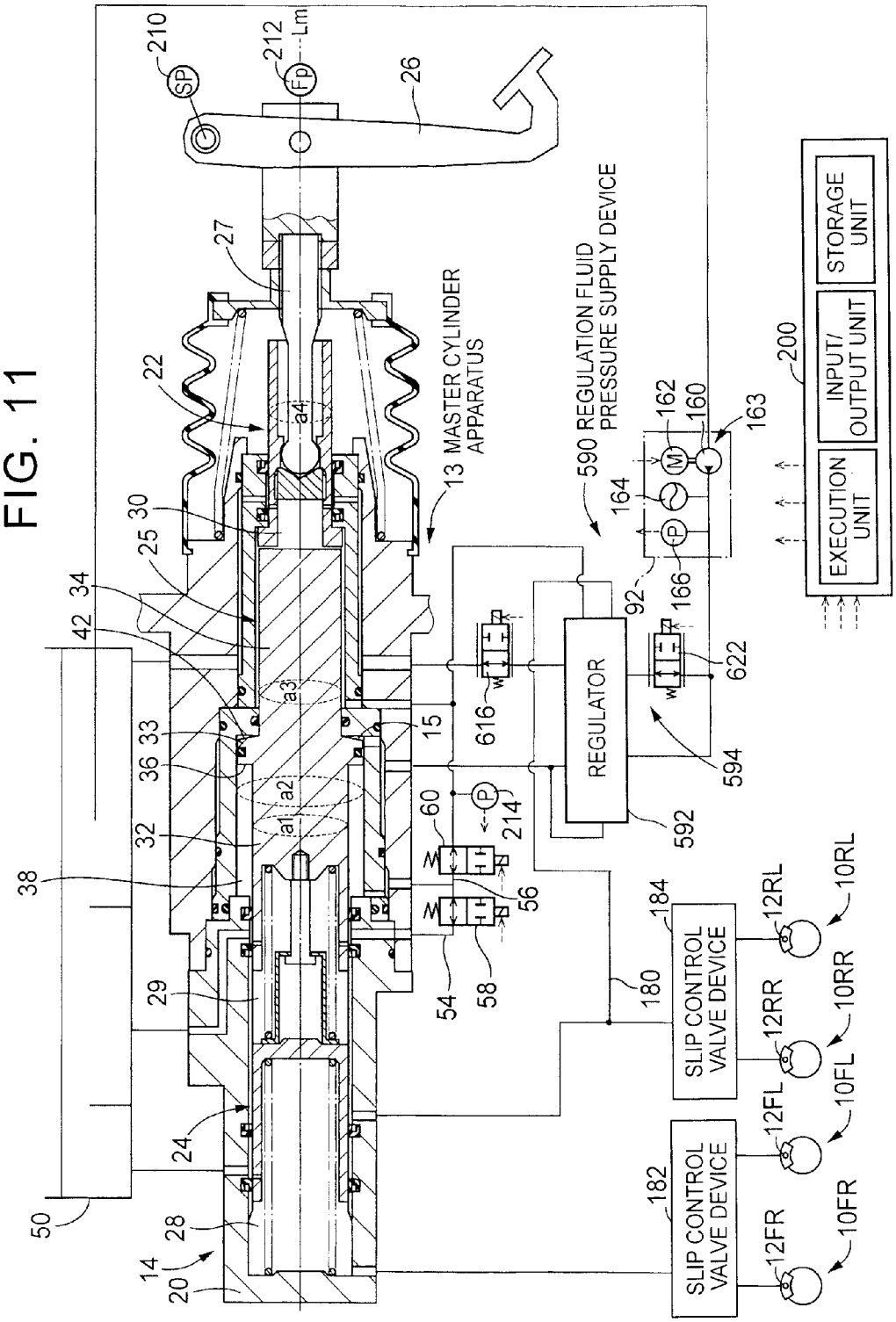
FIG. 11 is a view showing a hydraulic brake system including a master cylinder according to a fourth embodiment of the invention, wherein the hydraulic brake system includes a master cylinder apparatus according to the fourth embodiment of the invention.
Figure 12:
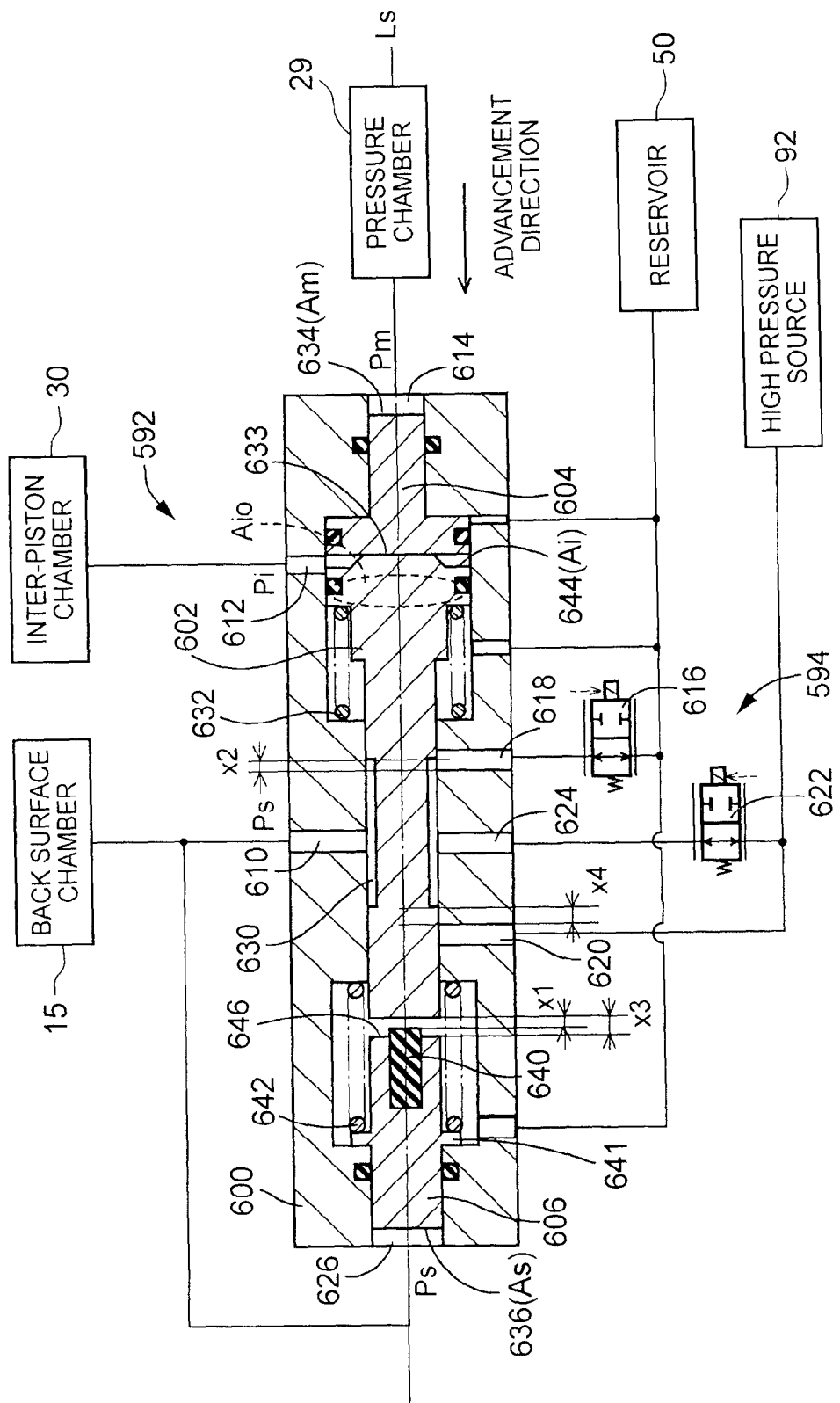
FIG. 12 is a sectional view showing a regulator of a regulation fluid pressure control device provided in the master cylinder apparatus.

The regulation fluid pressure supply device is not limited to the regulation fluid pressure supply device described in the first to third embodiments, and may have a structure illustrated in FIGS. 11 and 12. In this embodiment, a case in which a regulation fluid pressure supply device 590 is applied to the master cylinder apparatus according to the first embodiment will be described. All parts other than the regulation fluid pressure supply device 590 are identical to the first embodiment, and therefore description thereof has been omitted. The regulation fluid pressure supply device 590 includes a regulator 592, the high pressure source 92, and a linear valve device 594. As shown in FIG. 12, the regulator 592 is capable of controlling the regulation fluid pressure supplied to the back surface chamber 15 to a magnitude corresponding to the operating force applied to the brake pedal 26 (also referred to as a brake operating force hereafter) using the fluid pressure of the high pressure source 92. The regulator 592 includes a housing 600, a spool 602 fitted to the housing 600 to be capable of sliding, an advancement driving member 604 that applies force to the spool 602 in an advancement direction, and a retreat driving member 606 that applies force to the spool 602 in a retreat direction. The spool 602, the advancement driving member 604, and the retreat driving member 606 are respectively disposed on an identical axis (Ls) to be capable of moving relative to each other. The housing 600 is provided with an output port 610 to which the back surface chamber 15 is connected, an input port 612 to which the inter-piston chamber 30 is connected, a master pressure port 614 to which the pressure chamber 29 is connected, a low pressure port 618 to which the reservoir 50 is connected via a pressure reducing linear valve 616, a high pressure port 620 to which the high pressure source 92 is connected, a linear pressure port 624 to which the high pressure source 92 is connected via a pressure increasing linear valve 622, and a feedback pressure port 626 to which the back surface chamber 15 is connected. These ports are provided in the housing 600 at intervals from each other in a radial direction or a direction of the axis (Ls). An annular communication groove 630 extending in the axis (Ls) direction is formed in an outer peripheral portion of an intermediate portion of the spool 602. The communication groove 630 is formed in a position and a size whereby the output port 610 and the linear pressure port 624 are open normally, the low pressure port 618 opens when the spool 602 is in the retreat end position, and the high pressure port 620 opens when the spool 602 is in the advancement end position. Fluid pressure in the output port 610 is controlled by moving the spool 602 relative to the housing 600 so that either the low pressure port 618 or the high pressure port 620 is connected selectively to the output port 610. A return spring 632 is provided between the spool 602 and the housing 600 to bias the spool 602 in a retreat direction. Further, a rear end surface 633 of the spool 602 receives fluid pressure from the input port 612.

The advancement driving member 604 is disposed to the rear of the spool 602, and fluid pressure from the master pressure port 614 is received by a rear end surface 634 thereof. The advancement driving member 604 can be caused to advance by advancement direction force generated by the fluid pressure of the master pressure port 614, and applies the advancement direction force generated by the master pressure to the spool 602. Further, the advancement driving member 604 has a stepped shape including a small diameter portion and a large diameter portion, and the retreat end position is defined by contact between a step portion formed between the small diameter portion and the large diameter portion and the housing 600. In this condition, a front end surface of the advancement driving member 604 functions as a stopper that determines the retreat end position of the spool 602.

The retreat driving member 606 is disposed in front of the spool 602 via a gap, and fluid pressure from the feedback pressure port 626 is received by a front end surface 636 thereof. An elastic member 640 made of rubber or the like is provided on a rear portion (a main body rear portion) of the retreat driving member 606, and a retainer 641 having a stopper function is provided in an intermediate portion so as to project in the radial direction. The advancement end position is defined by contact between the retainer 641 having a stopper function and the housing 600. Meanwhile, a return spring 642 is provided between the retainer 641 having a stopper function and the housing 600 to bias the retreat driving member 606 in the advancement direction. A set load Fset of the return spring 642 is set at a comparatively large value. The retreat driving member 606 can be caused to retreat by retreat direction force of a magnitude obtained by subtracting an elastic force of the return spring 642 from the fluid pressure of the feedback pressure port 626, and applies the retreat direction force to the spool 602.

The spool 602, the advancement driving member 604, and the retreat driving member 606 are respectively fitted to the housing 600 to be fluid-tight. As a result, the master pressure port 614, the input port 612, and the feedback pressure port 626 are cut off from each other in a fluid-tight manner. Further, a surface area of the rear end surface 633 of the spool 602 is set as Aio, a surface area of a part 644 obtained by subtracting a surface area of a contact portion contacting the advancement driving member 604 from the rear end surface 633 (a surface area of an annular part, or in other words a surface area of a part that receives the fluid pressure of the input port 612 in a condition where the spool 602 contacts the advancement driving member 604) is set as Ai, a surface area of the rear end surface 634 of the advancement driving member 604 is set as Am, and a surface area of the front end surface 636 of the retreat driving member 606 is set as As. Furthermore, in a condition where the spool 602 is in the retreat end position and the retreat driving member 606 is in the advancement end position, a gap x1 between a rear end surface of the elastic member 640 provided on the retreat driving member 604 and a front end surface of the spool 602 equals or exceeds a distance x2 between a rear end surface of the communication groove 630 and the low pressure port 618 ($x1 \geq x2$), and a gap x3 between a main body rear end surface 646 of the retreat driving member 606 and the front end surface of the spool 602 equals or exceeds a distance x4 between a front end surface of the communication groove 630 of the spool 602 and the high pressure port 620 (x3≥x4), wherein the distance x1 is equal to or shorter than the distance x4 (x1≥x4). The distances x1 to x4 are designed so that the spool 602 can move to a pressure increasing position in which the output port 610 communicates with the high pressure port 620 via the communication groove 630 before the front end surface of the spool 602 contacts the main body rear end surface 646 of the retreat driving member 606, and so that in the pressure increasing position, the spool 602 contacts (and, in certain cases, elastically deforms) the elastic member 640.

As described above, the linear valve device 594 includes the pressure increasing linear valve 622 provided between the high pressure source 92 and the linear pressure port 624, and the pressure reducing linear valve 616 provided between the low pressure port 618 and the reservoir 50. Respective front-rear differential pressures of the pressure increasing linear valve 622 and the pressure reducing linear valve 616 can be controlled to magnitudes corresponding to amounts of current supplied to respective solenoids thereof. Further, the pressure increasing linear valve 622 and the pressure reducing linear valve 616 are normally open valves that are open when no current is supplied to the solenoids. The linear valve device 594 is used during an automatic brake operation such that when the brake, pedal 26 is operated, the pressure increasing linear valve 622 is kept closed and the pressure reducing linear valve 616 is kept open.

An operation of this hydraulic brake system will now be described.

[Initial Stage of Brake Operation]

When the brake pedal 26 is depressed, the reservoir connection valve 58 and the inter-chamber connection cutoff valve 60 are respectively set in a closed condition and an open condition. When the input piston 22 advances, the inter-piston chamber 30 is cut off from the reservoir 50, and as a result, fluid pressure is generated therein. The fluid pressure of the inter-piston chamber 30 is supplied to the regulator 592. In the regulator 592, the fluid pressure of the inter-piston chamber 30 is supplied from the input port 612 such that advancement direction force acts on the spool 602. When the advancement direction force exceeds a set load of the return spring 632, the spool 602 advances relative to the advancement driving member 604. The output port 610 is cut off from the low pressure port 618 and connected to the high pressure port 620, and as a result, fluid pressure starts to be supplied to the back surface chamber 15 (a point As in FIG. 13A). Since the high pressure port 620 communicates with the output port 610, the fluid pressure in the back surface chamber 15 increases on a large gradient in a region RAs in FIG. 13A. A position in which the output port 610 and the high pressure port 620 of the spool 602 communicate is available as the pressure increasing position. As described above, x1≥x2, x3≥x4, and x4≥x1, and therefore, when the advancement direction force acting on the spool 602 equals or exceeds a sum (F1+F2) of a force F1 by which the return spring 632 can be elastically deformed by a displacement amount x4 and a force F2 by which the elastic member 640 can, be elastically deformed by a displacement amount (x4−x1), the spool 602 is moved to the pressure increasing position (when x4=x1, F2 is zero). Further, in the pressure increasing position of the spool 602, the spool 602 contacts (and, in certain cases, elastically deforms) the elastic member 640. Note that in this embodiment, the set load and a spring constant of the return spring 632 and a set load and a spring constant of the elastic member 640 are set at small values, and therefore the spool 602 is moved to the pressure increasing position when the advancement direction force acting on the spool 602, or in other words the fluid pressure in the inter-piston chamber 30 (corresponding to the brake operating force) is small.

When the spool 602 is in the pressure increasing position, retreat direction force Fb having a magnitude indicated by a following equation is applied to the retreat driving member 606 by a fluid pressure Ps of the back surface chamber 15.

$$Fb = Ps \times As - Pi \times Aio \quad (1)$$

In the above equation, a fluid pressure Pi is the fluid pressure of the inter-piston chamber 30. The spool 602 contacts the elastic member 640 (the retreat driving member 606), and therefore advancement direction force generated by the fluid pressure in the input port 612 acts on the retreat driving member 606 via the spool 602. When the retreat direction force Fb acting on the retreat driving member 606 exceeds the set load Fset of the return spring 642 (Fb>Fset), the retreat driving member 606 is moved in the retreat direction, and as a result, the spool 602 retreats. The high pressure port 620 is disengaged from the communication groove 630, and the high pressure port 620 is cut off from the output port 610 (a point Bs in FIG. 13A). A fluid pressure Psa in the back surface chamber 15 at this point has a magnitude indicated by a following equation.

$$Psa = (Fsets + Pi \times Aio)/As \quad (2)$$

Further, a brake operating force Fps at this point has a magnitude corresponding to the fluid pressure Pi of the inter-piston chamber 30, and serves as the normal operation determination depression force.

[Normal Region, Emergency Operation]

When the brake operating force Fps reaches the normal operation determination depression force, similarly to the embodiments described above, the reservoir connection valve 58 and the connection cutoff valve 60 are switched respectively to the open condition and the closed condition. Further, in the regulator, when the fluid pressure in the pressure chamber 29 increases, leading to an increase in a fluid pressure Pm supplied to the master pressure port 614, the advancement driving member 604 advances so as to contact the spool 602. In a condition where the spool 602, the advancement driving member 604 and the retreat driving member 606 (the elastic member 640) contact each other, a force expressed by a following equation acts on the spool 602.

$$Ps \times As - (Ks \times \Delta + Fsets) = Pi \times Ai + Pm \times Am \quad (4)$$

Figures 13A, 13B:
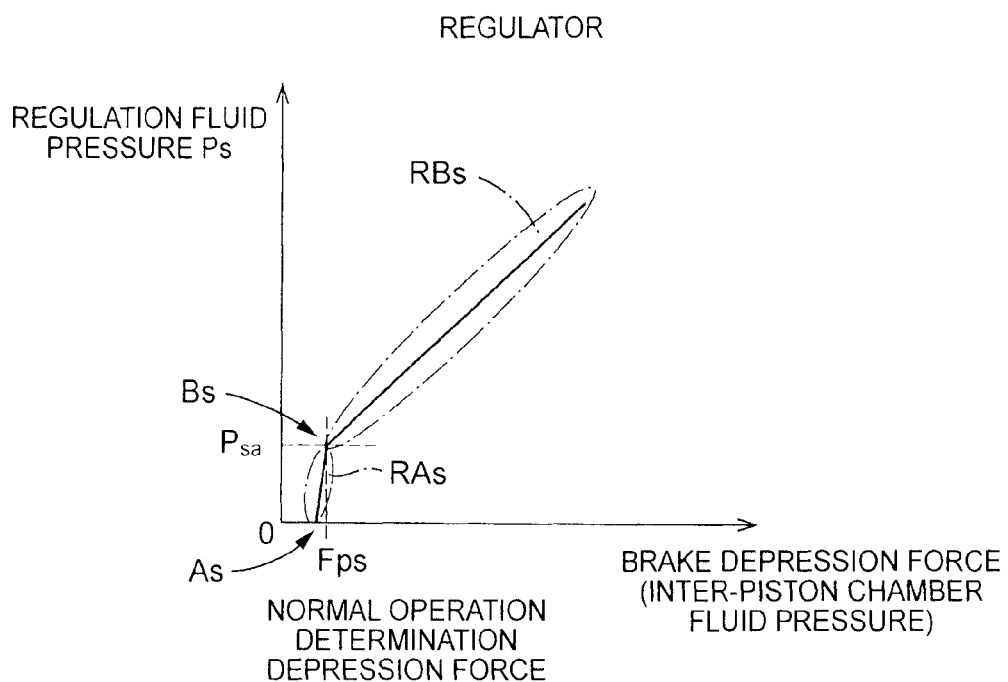
FIGS. 13A and 13B are views showing the relationship between the operating force exerted on the brake pedal and the regulation fluid pressure in the regulator in the hydraulic brake system.

In the above equation, Pm is the fluid pressure in the pressure chamber 29, Ks is a modulus of elasticity of the return spring 642, and Δ is a displacement amount of the return spring 642. According to the above equation, when the retreat direction force on the left side and the advancement direction force on the right side are counterbalanced, the spool 602 moves in the direction of the axis Ls such that the output port 610 communicates selectively with the high pressure port 620 and the low pressure port 12. As a result, an increase gradient of the regulation fluid pressure Ps relative to the brake operating force Fp (corresponding to the fluid pressure Pi of the inter-piston chamber 30 and the fluid pressure Pm of the pressure chamber 29) is smaller in a region RBs of FIG. 13A than in the region RAs. When the stroke of the brake pedal 26 subsequently reaches the emergency operation determination stroke, as shown in FIG. 13B, the reservoir connection valve 58 and the connection cutoff valve 60 are switched respectively to the open condition. As a result, the stroke velocity ratio between the input piston 22 and the pressure piston 25 reaches 1. As shown in FIG. 13B, the stroke velocity ratio of the master cylinder 14 varies in a similar manner to the embodiments described above.

According to this embodiment, in the regulator 592, the increase gradient of the regulation fluid pressure can be switched in two stages without controlling the linear valve device 594. Further, during the initial stage of the brake operation, the increase gradient of the regulation fluid pressure can be increased, and therefore an initial response delay in the brake can be suppressed favorably.

There are no limitations on the structure of the hydraulic brake circuit and so on, and in addition to the embodiments described above, the invention may be implemented in various other modified and amended embodiments on the basis of the knowledge of persons skilled in the art.

In the master cylinder described in the above embodiments, the master cylinder may include a back surface chamber formed rearward of a pressure receiving surface of the pressure piston, and the pressure piston can be caused to advance relative to the input piston by a fluid pressure in the back surface chamber. The pressure receiving surface is often provided on a rear portion of a large diameter portion of the pressure piston.

In the master cylinder described in the above embodiments, the master cylinder may further include an inter-piston chamber provided between the input piston and the pressure piston, and an effective pressure receiving surface area of the pressure piston relative to the inter-piston chamber may be set at a different magnitude to an effective pressure receiving surface area of the input piston relative to the inter-piston chamber. In a condition where the inter-piston chamber is cut off from a reservoir, the opposing chamber, and so on, the input piston and the pressure piston are moved relative to each other so that an amount of working fluid in the inter-piston chamber remains constant. When the effective pressure receiving surface area of the input piston relative to the inter-piston chamber is larger than the effective pressure receiving surface area of the pressure piston relative to the inter-piston chamber, the stroke of the pressure piston is larger than that of the input piston, and therefore the input piston and the pressure piston separate. When the effective pressure receiving surface area of the input piston is smaller than the effective pressure receiving surface area of the pressure piston, the stroke of the input piston is larger than that of the pressure piston, and therefore the input piston and the pressure piston approach each other.

According to the master cylinder described in the above embodiments, both the reservoir connection valve and the connection cutoff valve may be normally open valves that are open when no current is supplied to solenoids thereof. When an abnormality occurs in an electrical system, both the inter-piston chamber and the opposing chamber communicate with the reservoir. As a result, the input piston and the pressure piston can advance integrally, and fluid pressure can be generated in the pressure chamber.

According to the master cylinder described in the above embodiments, the master cylinder may include an input piston that is caused to advance by operating a brake operating member and a pressure piston provided coaxially with the input piston to be capable of advancing relative to the input piston, the input piston is disposed opposite the pressure piston via an inter-piston chamber, the pressure piston is formed in a stepped shape having a large diameter portion and a front side small diameter portion that is provided in front of the large diameter portion and has a smaller diameter than the large diameter portion, the master cylinder includes: an opposing chamber provided in front of a step portion formed between the large diameter portion and the front side small diameter portion; and an opposing chamber/inter-piston chamber connecting passage that connects the opposing chamber and the inter-piston chamber, and an effective pressure receiving surface area of the pressure piston relative to the opposing chamber is equal to or smaller than the effective pressure receiving surface area thereof relative to the inter-piston chamber ($a2-a1 \leq a3$).

n the master cylinder apparatus described in the above embodiments, the fluid pressure control unit includes a target fluid pressure determination unit that determines the target fluid pressure of the back surface chamber, and the target fluid pressure determination unit includes (a) first determining means for determining the target fluid pressure from a brake operation state quantity, which is represented by at least one of the operating stroke and the operating force of the brake operating member, and an initial gain, (b) second determining means for determining the target fluid pressure from the brake operation state quantity and a normal gain that is smaller than the initial gain, and (c) third determining means for determining the target fluid pressure from the brake operation state quantity and an emergency gain that is larger than the normal gain but smaller than the initial gain.

In the master cylinder apparatus described in the above embodiments, the first determining means may determine the target fluid pressure in an initial region at the start of a brake operation, the second determining means may determine the target fluid pressure in a normal region during a normal brake operation, and the third determining means may determine the target fluid pressure in an emergency region during an emergency brake operation.

In the master cylinder apparatus described in the above embodiments, the master cylinder apparatus may include a back surface fluid pressure control device that controls a fluid pressure in a back surface chamber provided rearward of a pressure receiving surface of the pressure piston, and the back surface fluid pressure control device may include: (a) a power fluid pressure source that is operated by a supply of electric power to be capable of outputting high-pressure fluid pressure; and (b) a regulator that controls the fluid pressure in the back surface chamber to a magnitude corresponding to the operating condition of the brake operating member using the fluid pressure of the power fluid pressure source. The pressure piston is caused to advance by the fluid pressure in the back surface chamber, and therefore, by controlling the fluid pressure in the back surface chamber to a magnitude corresponding to the operating condition of the brake operating member, the fluid pressure in the pressure chamber can also be controlled to a magnitude corresponding to the operating condition of the brake operating member. The operating condition of the brake operating member may be represented by at least one of the operating force applied to the brake operating member and the operating stroke thereof. Further, when an abnormality occurs in the electrical system, high-pressure fluid pressure often cannot be output to the regulator from the power fluid pressure source, and as a result, the fluid pressure in the back surface chamber cannot be controlled. In the master cylinder apparatus described in the above embodiments, the back surface fluid pressure control device includes: (i) a housing in which at least an output port connected to the back surface chamber, a high pressure port connected to the high pressure source, and a low pressure port connected to the reservoir are formed, (ii) a spool that is disposed in the housing to be capable of relative movement and can control fluid pressure output from the output port by connecting the output port selectively to the high pressure port or the low pressure port, and (iii) a regulator having a spool moving device which, when a force that acts on the spool and is determined by the operating condition of the brake operating member reaches or exceeds a predetermined set value while the spool is in a pressure increasing position in which the output port is cut off from the low pressure port and connected to the high pressure port, moves the output port to a non-pressure increasing position in which the output port is cut off from the high pressure port. While the force determined by the operating condition of the brake operating member remains smaller than the set value, or in other words in an initial stage of the brake operation, the spool is in the pressure increasing position, and therefore the fluid pressure in the back surface chamber can be increased on a large gradient.

The invention claimed is:

1. A master cylinder comprising:
   an input piston that is caused to advance by operating a brake operating member;
   a pressure piston that is provided coaxially with the input piston in order to increase a fluid pressure in a frontward pressure chamber while advancing;
   an inter-piston chamber disposed between the input piston and the pressure piston;
   an opposing chamber provided in front of the pressure piston;
   an opposing chamber/inter-piston chamber connecting passage connecting the opposing chamber and the inter-piston chamber;
   wherein the pressure piston includes a large diameter portion, a front side small diameter portion provided in front of the large diameter portion, and a step constituted by the large diameter portion and the front side small diameter portion;
   a surface area on which the pressure piston receives pressure from the opposing chamber is equal to or smaller than the surface area on which the pressure piston receives pressure from the inter-piston chamber; and
   a multistage modification device that varies a relationship between a stroke of the input piston and the fluid pressure in the pressure chamber in three or more stages while the input piston moves from a retreat end position to an advancement end position.

2. The master cylinder according to claim 1, wherein the multistage modification device switches between at least a first condition in which a stroke variation velocity of the pressure piston is larger than a stroke variation velocity of the input piston so that the pressure piston can advance relative to the input piston, a second condition in which the stroke variation velocity of the pressure piston is smaller than the stroke variation velocity of the input piston so that relative advancement is possible, and a third condition in which the stroke variation velocity of the pressure piston and the stroke variation velocity of the input piston are identical so that the input piston and the pressure piston can advance integrally.

3. The master cylinder according to claim 2, wherein the multistage modification device sets the first condition when a brake operation state quantity, which is represented by at least one of a depression force and an operating stroke of the brake operating member, is smaller than a predetermined normal operation determination state quantity, sets the second condition when the brake operation state quantity equals or exceeds the normal operation determination state quantity but is smaller than a predetermined emergency operation determination state quantity, and sets the third condition when the brake operation state quantity equals or exceeds the emergency operation determination state quantity.

4. The master cylinder according to claim 1, further comprising an inter-piston chamber provided between the input piston and the pressure piston, wherein a surface area on which the pressure piston receives pressure from the inter-piston chamber is larger than a surface area on which the input piston receives pressure from the inter-piston chamber.

5. The master cylinder according to claim 1, further comprising:
   a reservoir;
   an inter-piston chamber disposed between the input piston and the pressure piston;
   an opposing chamber provided in front of the pressure piston; and
   a communication control device that controls communication conditions between the inter-piston chamber, the opposing chamber, and the reservoir,
   wherein the pressure piston includes the large diameter portion, the front side small diameter portion provided in front of the large diameter portion, and the step constituted by the large diameter portion and the front side small diameter portion, and
   the communication control device switches between a first communication condition in which the opposing chamber and the inter-piston chamber communicate with each other but are cut off from the reservoir, a second communication condition in which the inter-piston chamber is cut off from the opposing chamber and the reservoir, and a third communication condition in which the opposing chamber and the inter-piston chamber communicate with the reservoir.

6. The master cylinder according to claim 5, wherein the communication control device comprises: a reservoir connection valve provided between the opposing chamber and the reservoir; a connection cutoff valve provided between the opposing chamber and the inter-piston chamber; and solenoid valve control portion that controls opening and closing of the reservoir connection valve and the connection cutoff valve.

7. The master cylinder according to claim 1, further comprising:
   an inter-piston chamber disposed between the input piston and the pressure piston;
   an opposing chamber provided in front of the pressure piston so as to always communicate with the reservoir;
   an in-piston connection cutoff valve provided in an interior of the pressure piston in order to cut the inter-piston chamber off from the opposing chamber when the input piston and the pressure piston are separated from each other and connect the inter-piston chamber to the opposing chamber when the input piston and the pressure piston contact each other; and
   a check valve provided in the interior of the pressure piston parallel to the in-piston connection cutoff valve in order to allow a working fluid to flow from the opposing chamber into the inter-piston chamber and prevent the working fluid from flowing in reverse.

8. The master cylinder according to claim 7, wherein the in-piston connection cutoff valve is provided in a fluid passage formed in the interior of the pressure piston to connect the inter-piston chamber to the opposing chamber, and includes a valve seat, a valve element capable of approaching and separating from the valve seat, and a spring that biases the valve element in a direction of seating the valve element on the valve seat, and the input piston includes a valve opening member that contacts the pressure piston in order to cause the valve element to separate from the valve seat.

9. A master cylinder apparatus comprising:
the master cylinder according to any one of claim 1, and
a back surface fluid pressure control device that controls a fluid pressure of a back surface chamber provided in the master cylinder,
wherein the back surface chamber is provided rearward of a surface that receives pressure from the pressure piston, and
the back surface fluid pressure control device comprises:
a power fluid pressure source that is operated by a supply of electric power to be capable of outputting high-pressure fluid pressure; and
a fluid pressure control unit that brings the fluid pressure of the back surface chamber close to a target fluid pressure by using the fluid pressure from the power fluid pressure source.

10. A master cylinder comprising:
an input piston that is caused to advance by operating a brake operating member;
a pressure piston that is provided coaxially with the input piston and is configured to advance relative to the input piston;
an inter-piston chamber disposed between the input piston and the pressure piston;
an opposing chamber provided in front of the pressure piston;
an opposing chamber/inter-piston chamber connecting passage connecting the opposing chamber and the inter-piston chamber;
wherein the pressure piston includes a large diameter portion, a front side small diameter portion provided in front of the large diameter portion, and a step constituted by the large diameter portion and the front side small diameter portion;
a surface area on which the pressure piston receives pressure from the opposing chamber is equal to or smaller than the surface area on which the pressure piston receives pressure from the inter-piston chamber; and
a velocity ratio multistage modification device that varies a velocity ratio, which is a ratio between a variation speed of a stroke of the pressure piston and a variation speed of a stroke of the input piston, in three or more stages while the input piston moves from a retreat end position to an advancement end position.

11. A master cylinder apparatus comprising:
the master cylinder according to claim 10, and
a back surface fluid pressure control device that controls a fluid pressure of a back surface chamber provided in the master cylinder,
wherein the back surface chamber is provided rearward of a surface that receives pressure from the pressure piston, and
the back surface fluid pressure control device comprises:
a power fluid pressure source that is operated by a supply of electric power to be capable of outputting high-pressure fluid pressure; and
a fluid pressure control unit that brings the fluid pressure of the back surface chamber close to a target fluid pressure by using the fluid pressure from the power fluid pressure source.

12. A master cylinder comprising:
an input piston that is caused to advance by operating a brake operating member;
a pressure piston that is provided coaxially with the input piston and is configured to advance relative to the input piston;
an inter-piston chamber that is provided between the input piston and the pressure piston;
an opposing chamber provided in front of the pressure piston;
an opposing chamber/inter-piston chamber connecting passage connecting the opposing chamber and the inter-piston chamber;
wherein the pressure piston includes a large diameter portion, a front side small diameter portion provided in front of the large diameter portion, and a step constituted by the large diameter portion and the front side small diameter portion;
wherein a surface area on which the pressure piston receives pressure from the inter-piston chamber is larger than a surface area on which the input piston receives pressure from the inter-piston chamber; and
a multistage modification device that varies a relationship between a stroke of the input piston and the fluid pressure in the pressure chamber in three or more stages while the input piston moves from a retreat end position to an advancement end position.

13. A master cylinder apparatus comprising:
the master cylinder according to claim 12, and
a back surface fluid pressure control device that controls a fluid pressure of a back surface chamber provided in the master cylinder,
wherein the back surface chamber is provided rearward of a surface that receives pressure from the pressure piston, and
the back surface fluid pressure control device comprises:
a power fluid pressure source that is operated by a supply of electric power to be capable of outputting high-pressure fluid pressure; and
a fluid pressure control unit that brings the fluid pressure of the back surface chamber close to a target fluid pressure by using the fluid pressure from the power fluid pressure source.

* * * * *